(12) United States Patent
Yamada et al.

(10) Patent No.: US 7,478,046 B2
(45) Date of Patent: Jan. 13, 2009

(54) SERVER-CLIENT TYPE SPEECH RECOGNITION APPARATUS AND METHOD

(75) Inventors: Eiko Yamada, Tokyo (JP); Hiroshi Hagane, Tokyo (JP); Kazunaga Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 940 days.

(21) Appl. No.: 10/481,324

(22) PCT Filed: Jun. 20, 2002

(86) PCT No.: PCT/JP02/06156

§ 371 (c)(1),
(2), (4) Date: Jul. 13, 2004

(87) PCT Pub. No.: WO03/001511

PCT Pub. Date: Jan. 3, 2003

(65) Prior Publication Data

US 2004/0243414 A1    Dec. 2, 2004

(30) Foreign Application Priority Data

Jun. 20, 2001   (JP)   ............................. 2001-186926

(51) Int. Cl.
*G10L 15/22*   (2006.01)
*G10L 11/02*   (2006.01)
*H04B 1/66*    (2006.01)

(52) U.S. Cl. .................... 704/253; 704/270.1; 704/500

(58) Field of Classification Search ................ 704/270, 704/270.1, 275, 211, 215, 253, 500, 501, 704/503

See application file for complete search history.

(56) References Cited

U.S. PATENT DOCUMENTS 5,029,212 A * 7/1991 Yoshida ...................... 704/256

(Continued)

FOREIGN PATENT DOCUMENTS

EP       0 872 827 A2    10/1998

(Continued)

OTHER PUBLICATIONS

Digalakis V V et al.: "Quantization of Cepstral Parameters for Speech Recognition over the World Wide Web" IEEE Journal on Selected Areas in Communications, IEEE Inc. New York, US, vol. 17 No. 1, Jan. 1999, pp. 82-90, XP000800684, ISSN: 0733-8716 Chapter III.A and Chapter IV, first 6 lines.

(Continued)

*Primary Examiner*—Martin Lerner
(74) *Attorney, Agent, or Firm*—Sughrue Mion, PLLC

(57) ABSTRACT

To provide a speech recognition apparatus which enables the reduction of transmission time and of costs. A terminal-side apparatus (100) includes a speech detection portion (101) for detecting a speech interval of inputted data, a waveform compression portion (102) for compressing waveform data at the detected speech interval, and a waveform transmission portion (103) for producing the compressed waveform data. A server-side apparatus (200) includes a waveform reception portion (201) for receiving the waveform data transmitted from the terminal-side apparatus, a waveform decompression portion (202) for decompressing the received waveform data, an analyzing portion (203) for analyzing the decompressed waveform data, and a recognizing portion (204) for performing recognition processing to produce a recognition result.

41 Claims, 10 Drawing Sheets

U.S. PATENT DOCUMENTS

| | | | |
|---|---|---|---|
| 5,086,472 A * | 2/1992 | Yoshida | 704/255 |
| 5,150,449 A * | 9/1992 | Yoshida et al. | 704/232 |
| 5,712,956 A * | 1/1998 | Yamada et al. | 704/234 |
| 5,884,269 A * | 3/1999 | Cellier et al. | 704/501 |
| 5,953,700 A * | 9/1999 | Kanevsky et al. | 704/270.1 |
| 5,960,399 A * | 9/1999 | Barclay et al. | 704/270.1 |
| 6,006,184 A * | 12/1999 | Yamada et al. | 704/246 |
| 6,047,256 A * | 4/2000 | Koga et al. | 704/256.7 |
| 6,341,263 B1 * | 1/2002 | Yamada et al. | 704/239 |
| 6,366,886 B1 * | 4/2002 | Dragosh et al. | 704/270.1 |
| 6,408,272 B1 * | 6/2002 | White et al. | 704/270.1 |
| 6,760,705 B2 * | 7/2004 | Dvorak | 704/270.1 |
| 6,775,652 B1 * | 8/2004 | Cox et al. | 704/236 |
| 2004/0053646 A1 * | 3/2004 | Noguchi et al. | 455/563 |
| 2004/0162731 A1 * | 8/2004 | Yamada et al. | 704/270.1 |
| 2007/0143102 A1 * | 6/2007 | Yamada | 704/200 |

FOREIGN PATENT DOCUMENTS

| | | |
|---|---|---|
| EP | 1 006 509 A1 | 6/2000 |
| JP | H05-066793 A | 3/1993 |
| JP | H05-181493 A | 7/1993 |
| JP | H09-106300 A | 4/1997 |
| JP | H09-275391 A | 10/1997 |
| JP | 10-243048 A | 9/1998 |
| JP | H11-110913 A | 4/1999 |
| JP | 11-184780 A | 9/1999 |
| JP | 2000-40051 A | 2/2000 |
| JP | 2000-59471 A | 2/2000 |
| JP | 2000-194700 A | 7/2000 |
| JP | 2000-224226 A | 8/2000 |
| JP | 2000-268047 A | 9/2000 |
| JP | 2001-118330 A | 4/2001 |
| JP | 2001-142488 A | 5/2001 |
| JP | 2001-144663 A | 5/2001 |
| JP | 2001-195087 A | 7/2001 |

OTHER PUBLICATIONS

"Nikkei Internet Technology", May 1998, pp. 75-93.

Nakagawa, Speech Recognition Using Probability Model, The Institute of Electronics, Information and Communication Engineers, 1988, pp. 44-47, 82-89, and 136-137.

Furui, "Digital Speech Processing", The Acoustical Society of Japan, Tokai University Press, 1985, pp. 44-47.

Sakoe, "Speech Recognition Using DP Matching for Inclination Limitation", Onsei Koron, 1974, pp. 67-68.

Satour Imai, "Onsei Shingo Shori" First Edition, Morikita Shuppan Co., Ltd., p. 48-49, Nov. 30, 1996.

* cited by examiner

SERVER-CLIENT TYPE SPEECH RECOGNITION APPARATUS AND METHOD

TECHNICAL FIELD

The present invention relates to a speech recognition technology. More particularly, the present invention relates to a server-client type speech recognition apparatus and method in which the speech is detected on a terminal (client) such as a mobile phone and the speech is analyzed and recognized on the server side.

BACKGROUND ART

Conventionally, various server-client type speech recognition apparatuses are well known, and are mainly classified into three types as will be described hereinbelow.

In a first conventional server-client type speech recognition apparatus, the speech is detected on the terminal side (client side) apparatus, waveform data after detection is transmitted to a server side apparatus, and the transmitted data is analyzed and recognized on the server side apparatus. As one example of the conventional first server-client type speech recognition apparatus, a speech recognition apparatus using a Dialogic CSP (Continuous Speech Processing) is well known.

In a second conventional server-client type speech recognition apparatus, the speech is detected on the terminal side apparatus, waveform data after detection is compressed, the compressed waveform data is transmitted to the server side apparatus, the sever side apparatus decompresses transmitted waveform data, detects the speech for recognition again, analyzes and recognizes the waveform data after detection. Here, as a well-known technology in which the speech is detected on the terminal side apparatus, the waveform data after detection is compressed, and the compressed waveform data is transmitted to the server side apparatus, a document 1 (Nikkei Internet Technology, pp. 75 to 93, on May, 1998) specifically discloses VoIP (Voiceover Internet Protocol).

A third conventional server-client type speech recognition apparatus is recently proposed in a standardization project operated by Working Group of ETSI (the European Telecommunications Standards Institute)-STQ Aurora DSR (Distributed Speech Recognition) as one of working groups of 3GPP (Third Generation Partnership Project). That is, in the third conventional server-client type speech recognition apparatus, the speech is detected and analyzed on the terminal side apparatus, a parameter after analysis (characteristic vector) is transmitted to the server side apparatus, and the speech is recognized on the server side apparatus.

However, the first through third conventional server-client type speech recognition apparatuses have the following problems.

That is, in the first conventional server-client type speech recognition apparatus, inasmuch as the waveform data detected on the terminal side apparatus is transmitted to the server side apparatus without the compression thereof, there is a problem that time and costs for transmission are increased.

The second conventional server-client type speech recognition apparatus has a problem that, inasmuch as the server side apparatus re-detects the speech for recognition of the data which is subjected to the speech recognition and the decompression on the terminal side apparatus, the overlapped speech detection is unnecessary. Further, the second conventional server-client type speech recognition apparatus has a problem that the speech for recognition is detected on the server side and therefore in the case of canceling the detecting the start of the short speech on the server side apparatus, the reception of the information on canceling the speech detection on the terminal side is delayed and the operation of application is delayed.

The third conventional server-client type speech recognition apparatus has one problem that inasmuch as a parameter used for recognition (after analysis) is determined, the specific parameter is not used. Further, the third conventional server-client type speech recognition apparatus has another problem that inasmuch as an analysis portion is set to the terminal side apparatus, costs and time for providing a new analysis method to a terminal are increased.

In addition, the following documents are well known as related-art documents of the present invention.

Japanese Unexamined Patent Publication (JP-A) No. 2000-268047 discloses "information providing system, client, information providing server, and information providing method" in which a server system determines the feeling and situation of an operator based on speech information on a call of the operator, positional information, time information, weather information and organic information, and the information provided based on the feeling and situation is transmitted to a client. The information providing system disclosed in this Publication includes the client and the server system. The client comprises a communication unit for transmitting, to the server system via a network, operator information which is information related to an operator, and an output unit for receiving the information for providing via the network from the server system to produce the received providing information. The server system comprises an analysis information storing unit for storing the providing information and analysis information for analyzing the operation information, a selecting server for selecting, from the providing information storing unit, the providing information suitable to the transmission to the client based on the operator information and the analysis information which are transmitted from the client, and an information providing server for transmitting, to the client via the network, the providing information selected by the selecting server.

As disclosed in Japanese Unexamined Patent Publication (JP-A) No. 2000-268047, the server system further comprises a speech recognition server. The speech recognition server receives the speech information transmitted from the client, and recognizes the speech of the speech information which is received based on an acoustic analysis unit, an acoustic model, and a language model and so on. The acoustic analysis unit is a processing unit for extracting a series of the amount of acoustic characteristics for information on input speech. The acoustic model is information used for estimating the similarity between the speech and a pattern of the partly or entirely series of the amount of acoustic characteristics by using an estimation expression for estimating the acoustic similarity and the individual amount of acoustic characteristics extracted by the acoustic analysis unit. Further, the language model is information for supplying the limitation on the connection of the acoustic model.

In addition, Japanese Unexamined Patent Publication (JP-A) No. 2000-194700 discloses "information processing unit and method, and providing medium" in which contents of speech recognition and machine translation are easily changed. As disclosed in this Publication, a terminal is a device having a phone function, and is connected to a network. A user can call phone (speak) via the terminal. The user allows one of three translation service providing devices to translate the contents of speech. The translation service providing device is a server having a speech recognition function, a machine translation function, a speech synthesis function, and history information storage function. The translation service providing device stores, by the history information storage function, the contents of the speech at to the present, executes the translation processing based on the storage contents, and provides the information on the speech history information as needed to another translation service providing device.

DISCLOSURE OF INVENTION

It is a main problem to be solved by the present invention to provide a speech recognition apparatus and a method thereof in which the transmitting time and costs are reduced.

In order to provide means for solving the above problem, a server-client type speech recognition apparatus according to a first aspect of the present invention comprises a terminal-side (client-side) apparatus which comprises a speech detection portion for detecting a speech interval of inputted data; a waveform compression portion for compressing the waveform data at the speech interval detected by the speech detection portion; and a waveform transmission portion for transmitting the waveform data compressed by the waveform compression portion, and a server-side apparatus which comprises a waveform reception portion for receiving the waveform data transmitted from the terminal-side apparatus; a waveform decompression portion for decompressing the waveform data received by the waveform reception portion; and a recognizing portion for performing recognition processing by using the waveform data decompressed by the waveform decompression portion to produce a recognition result.

In the server-client type speech recognition apparatus according to a second aspect of the present invention, the terminal-side apparatus may comprise a waveform and signal reception portion for receiving the inputted waveform data and a waveform data re-transmission request signal transmitted from the server-side apparatus, and a waveform storing portion which temporarily stores the waveform data compressed by the waveform compression portion, simultaneously transmitting the waveform data to the waveform transmission portion, and transmits the stored waveform data to the waveform transmission portion when the waveform and signal reception portion receives the waveform data re-transmission request signal from the server-side apparatus.

In the server-client type speech recognition apparatus according to a third aspect of the present invention, the server-side apparatus may comprise the waveform and signal reception portion for receiving the waveform data transmitted from the terminal-side apparatus and a start-point cancel signal, and the recognizing portion may stop the recognition processing when the start-point cancel signal is received.

A server-client type speech recognition apparatus according to a forth aspect of the present invention comprises a terminal-side (client-side) apparatus which comprises a speech detection portion for detecting a speech interval of inputted data; a speech synthesizing portion for synthesizing a synthesis sound; a synthesis sound an information forming portion for forming the information on the synthesis sound synthesized by the speech synthesis portion to produce the synthesis sound; a waveform compression portion for compressing the waveform data during the speech interval detected by the speech detection portion and for containing the synthesis sound information formed by the synthesis sound information forming portion in a part of the waveform data; and a waveform transmission portion for transmitting the waveform data compressed by the waveform compression portion, and a server-side apparatus which comprises a waveform reception portion for receiving the waveform data transmitted from the terminal-side apparatus, a waveform decompression portion for decompressing the waveform data received by the waveform reception portion; a synthesis sound information obtaining portion for obtaining the synthesis sound information from data decompressed by the waveform decompression portion, and a recognizing portion for performing recognition processing by using the waveform data decompressed by the waveform decompression portion to produce a recognition result and for associating the synthesis sound with the recognition result based on the synthesis sound information obtained by the synthesis sound information obtaining portion upon ending the recognition to produce an associated recognition result or the recognition result and the synthesis sound information.

A server-client type speech recognition apparatus comprises a terminal-side apparatus which comprises a waveform, signal, compressing method reception portion for receiving inputted waveform data, a waveform data re-transmission request signal transmitted from a server-side apparatus, and compressing method information available to the server-side apparatus that is transmitted from the server-side apparatus, a compressing method selection portion for selecting an optimum compressing method from the compressing method information sent from the waveform, signal, and compressing method reception portion when the waveform, signal, and compressing method reception portion receives the compressing method information available to the server-side apparatus; a compressing method index forming portion for forming an index of the compressing method selected by the compressing method selection portion; a speech detection portion for detecting a speech interval of the waveform data inputted by the waveform, signal, compressing method reception portion; a speech synthesizing portion for synthesizing a synthesis sound; a synthesis sound information forming portion for forming information on the synthesis sound synthesized by the speech synthesizing portion to produce the synthesis sound, a waveform compression portion for compressing the waveform data at the speech interval detected by the speech detection portion and for containing the synthesis sound information formed by the synthesis sound information forming portion and the compressing method index formed by the compressing method index forming portion, and the server-side apparatus which comprises a waveform and signal reception portion for receiving waveform data transmitted from the terminal-side apparatus and the compressing method request signal; a compressing method storing portion for storing compressing methods available to the server-side apparatus; a compressing method obtaining portion for obtaining the compressing method stored in the compressing method storing portion to transmit the compressing method information to the terminal-side apparatus when the compressing method request signal is sent from the waveform and signal reception portion; a waveform decompressing portion for decompressing the waveform data received in the waveform and signal reception portion; a synthesis sound information obtaining portion for obtaining the synthesis sound information from the data decompressed by the waveform decompression portion; a recognizing for performing recognition processing by using the waveform data decompressed by the waveform decompression portion to produce a recognition result and for associating the synthesis sound with the recognition result from the synthesis sound information obtained by the synthesis sound information obtaining portion upon ending the recognition to produce an associated recognition result or the recognition result and the synthesis sound information, a compressing method index obtaining portion for obtaining an index of the compressing method from the data decompressed by the waveform decompression portion; a recognition engine selection portion for selecting a recognition engine from the index of the compressing method obtained by the compressing method index obtaining portion; and a recognition engine setting portion for setting the engine selected by the recognition engine selection portion from stored engines.

In a server-client type speech recognition apparatus according to a sixth aspect of the present invention, the server-side apparatus further comprises a waveform, signal, task information reception portion for receiving waveform data transmitted from the terminal-side apparatus, a start-point cancel signal, a compressing method request signal, and task information transmitted from a contents side, a task information storing portion for storing the task information received by the waveform, signal, and task information reception portion, and a compressing method and task information corresponding table storing portion for storing the task information and one ore more compressing methods available to the use of the task, and a compressing method obtaining portion for obtaining an available compressing method information from the task information sent from the task information storing portion and the corresponding table between the compressing method and the task information sent from the compressing method and task information corresponding table storing portion when the compressing method request signal is received in the waveform, signal, and task information reception portion.

In a server-client type speech recognition apparatus according to a seventh embodiment of the present invention, the terminal-side apparatus further comprises a waveform, signal, compressing method, and task information reception portion for receiving the inputted waveform data, the task information transmitted from the contents side, the waveform data re-transmission request signal transmitted from the server-side apparatus, and the compressing method information available to the server-side apparatus that is transmitted from the server-side apparatus, a task information storing portion for storing the task information received by the waveform, signal, compressing method, and task information reception portion, a compressing method and task information corresponding table storing portion for storing a corresponding table between the task information and one or more compressing methods available to the use of the task, and a compressing method selection portion for selecting an optimum compressing method based on the task information sent from the task information storing portion, the corresponding table between the task information and the compressing methods sent from the compressing method and task table corresponding table storing portion, and the compressing method information available to the server-side apparatus sent from the waveform, signal, compressing method, and task information reception portion when the compressing method information available to the server-side apparatus is received in the waveform, signal, compressing method, and task information reception portion.

BEST MODE FOR CARRYING OUT THE INVENTION

Embodiments of the present invention will be described. In order to solve the above-mentioned conventional problems, this invention comprises a server-client type speech recognition apparatus which consists of a server-side apparatus and a terminal-side apparatus. In the server-client type speech recognition apparatus, the terminal-side apparatus detects the speech for recognition, compresses waveform data after detects, and transmits the waveform data after compression to the server device, and the server-side apparatus decompresses, analyzes and recognizes the speech.

FIRST EMBODIMENT

Figure 1A:
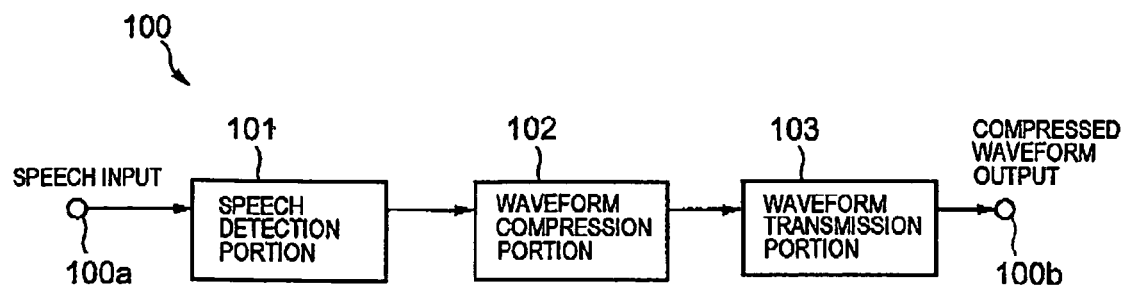
FIG. 1A is a block diagram showing a terminal side apparatus according to a first embodiment of the present invention.
Figure 1B:
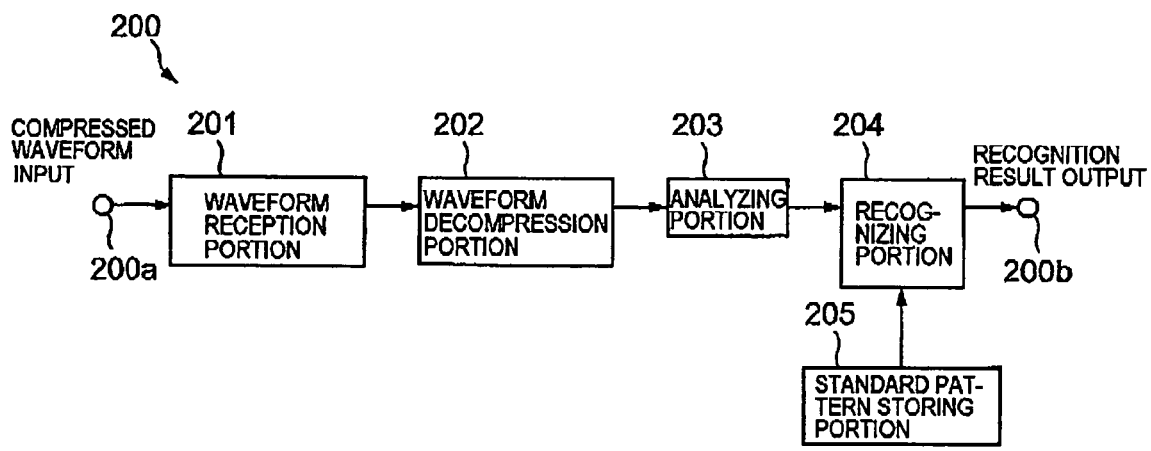
FIG. 1B is a block diagram showing a server side apparatus according to the first embodiment of the present invention.

Referring to FIGS. 1A and 1B, the description will proceed to a server-client type speech recognition apparatus according to a first embodiment of the present invention. FIG. 1A shows the structure of a terminal-side apparatus 100. FIG. 1B shows the structure of a server-side apparatus 200. The terminal-side apparatus 100 is simply referred to as a terminal and the server-side apparatus 200 is simply refereed to as a server apparatus.

Referring to FIG. 1A, the terminal-side apparatus 100 has an input terminal 100a and an output terminal 100b. The terminal-side apparatus 100 comprises a speech detection portion 101, a waveform compression portion 102, and a waveform transmission portion 103.

Supplied to the terminal-side apparatus 100 from the input terminal 100a, speech data is sent to the speech detection portion 101 in which the speech is detected. That is, the speech detection portion 101 detects a speech interval of the inputted speech data. As a method for detecting the speech, a word spotting method and the like are used. The word spotting method is refereed to as the disclosure of a document 2 ("Speech Recognition Using Probability Model" written by Nakagawa, in the article of The Institute of Electronics, Information and Communication Engineers in 1988).

The speech data detected by the speech detection portion 101 is sent to the waveform compression portion 102. The waveform compression portion 102 compresses the waveform data sent from the speech detection portion 11. That is, the waveform compression portion 102 compresses the waveform data of the speech interval detected by the speech detection portion 101. A compressing method may use a VSELP (Vector Sum Excited Linear Prediction) method, a PSI-CELP (Pitch Synchronous Innovation CELP) method, and the like.

The waveform data compressed by the waveform compression portion 102 is sent to the waveform transmission portion 103. The waveform transmission portion 103 transmits the compressed waveform data sent from the waveform compression portion 102 to the server-side apparatus 200 from the output terminal 100b. In other words, the waveform transmission portion 103 transmits the waveform data compressed by the waveform compression portion 102 to the server-side apparatus 200 from the output terminal 100b.

Referring to FIG. 1B, the server-side apparatus 200 has an input terminal 200a and an output terminal 200b. The server-side apparatus 200 comprises a waveform reception portion 201, a waveform decompression portion 202, an analyzing portion 203, a recognizing portion 204, and a standard pattern storing portion 205.

Transmitted from the waveform transmission portion 103 in the terminal-side apparatus 100, the compressed waveform data is received by the waveform reception portion 201 via the input terminal 200a in the server-side apparatus 200. That is, the waveform reception portion 201 receives the compressed waveform data transmitted from the terminal-side apparatus 100. The waveform reception portion 201 sends the received waveform data to the waveform decompression portion 202.

The waveform decompression portion 202 decompresses the compressed waveform data sent from the waveform reception portion 201. In other words, the waveform decompression portion 202 decompresses the waveform data received by the waveform reception portion 201. The waveform data decompressed by the waveform decompression portion 202 is sent to the analyzing portion 203.

The analyzing portion 203 converts, into a characteristic vector, the waveform data decompressed by the waveform decompression portion 202. In other words, the analyzing portion 203 analyzes the speech by using the waveform data decompressed by the waveform decompression portion 202. The characteristic vector may use a cepstrum vector, a Δcepstrum vector, or the like. The Δcepstrum is disclosed in a document 3 ("Digital Speech Processing" written by Furui at pages 44 to 47 in the book published by TOKAI UNIVERSITY PRESS in 1985). The characteristic vector analyzed by the analyzing portion 203 is sent to the recognizing portion 204.

The recognizing portion 204 calculates the likelihood between the characteristic vector sent from the analyzing portion 203 and the standard patterns sent from the standard pattern storing portion 205 so as to obtain a recognition result. That is, the recognizing portion 204 performs recognition processing based on an analysis result (the amount of characteristics) in the analyzing portion 203 and the standard patterns stored in the standard pattern storing portion 205. A method for calculating the likelihood may use Viterbi algorithm, DP matching, or the like. The recognition result obtained by the recognizing portion 204 is outputted from the input terminal 200a. The Viterbi algorithm is disclosed in the document 2 ("Speech Recognition Using Probability Model" written by Nakagawa, in the article of The Institute of Electronics, Information and Communication Engineers in 1988). The DP matching is referred to as the disclosure of a document 4 (Speech Recognition using DP matching for inclination limitation written by Sakoe at pages 67 to 68 in "Onsei Koron" in 1974).

At any rate, a combination of the analyzing portion 203, the recognizing portion 204, and the standard pattern storing portion 205 serves as recognizing means which performs the recognition processing by using the waveform data decompressed by the waveform decompression portion 202 to produce the recognition result.

According to the first embodiment, the waveform data compressed after detecting the speech is transmitted to the server-side apparatus 200 from the terminal-side apparatus 100 so as to analyze and recognize the speech by the server-side apparatus 200 and, therefore, the specification of the parameter (characteristic vector) after analysis can freely be set.

Inasmuch as the server-side apparatus 200 comprises the analyzing portion 203 and the recognizing portion 204, the costs and time for a new analysis method and a new recognition method are reduced.

Further, inasmuch as the transmitted waveform data is data after compression, advantageously, the time and costs for transmission are reduced.

According to the first embodiment, the speech recognition method comprises, in the terminal-side apparatus 100, a step of detecting the speech interval of the inputted speech data, a step of compressing the waveform data of the detected speech interval, and a step of transmitting the compressed waveform data to the server-side apparatus 200, and, in the server-side apparatus 200, a step of receiving the waveform data transmitted from the terminal-side apparatus 100, a step of decompressing the received waveform data, and a step of performing the recognition processing by using the decompressing waveform data to produce the recognition result.

SECOND EMBODIMENT

Figure 2A:
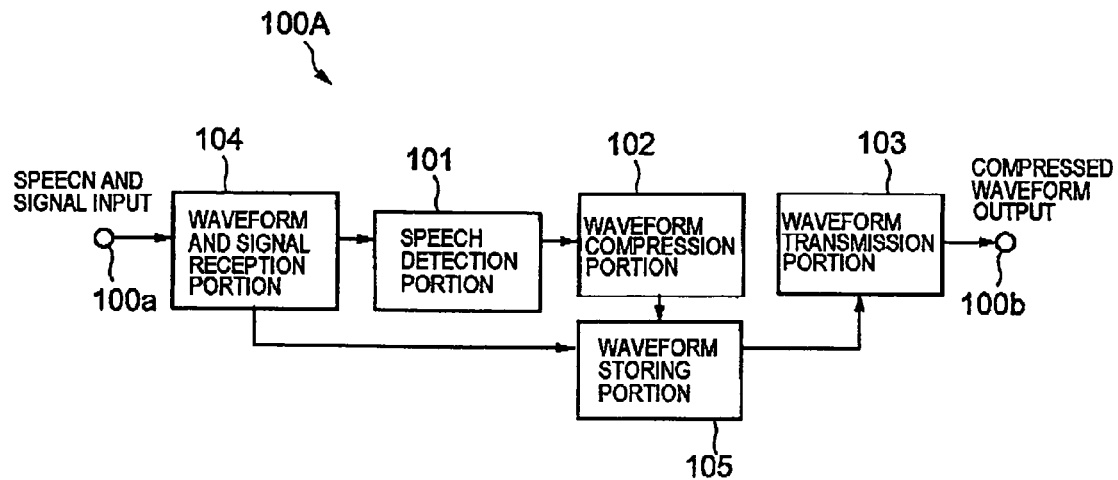
FIG. 2A is a block diagram showing a terminal side apparatus according to a second embodiment of the present invention.
Figure 2B:
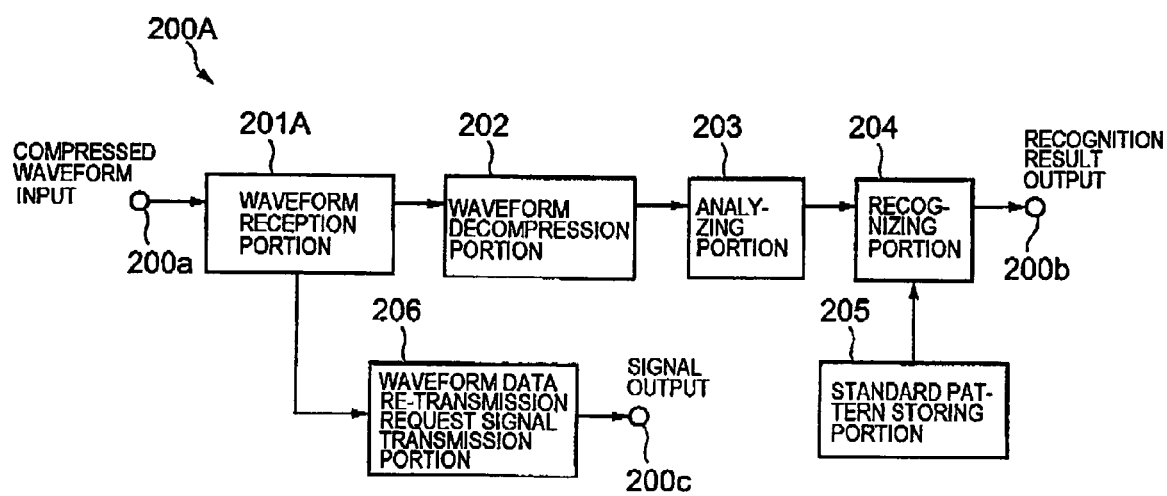
FIG. 2B is a block diagram showing a server side apparatus according to the second embodiment of the present invention.

Referring to FIGS. 2A and 2B, the description will proceed to a server-client type speech recognition apparatus according to a second embodiment of the present invention. FIG. 2A shows the structure of the terminal-side apparatus 100A. FIG. 2B shows the structure of the server-side apparatus 200A.

According to the second embodiment of the present invention, the server-client type speech recognition apparatus comprises the structure according to the first embodiment and further comprises the following frame and mechanism. In other words, in the frame and mechanism, when the reception of the compressed waveform data fails in the server-side apparatus 200A, a waveform data re-transmission request signal is transmitted to the terminal-side apparatus 100A from the server-side apparatus 200A. The terminal-side apparatus 100A may re-transmit the compressed waveform data to the server-side apparatus 200A. With the structure, the rate for transmitting the waveform data from the server-side apparatus 100A to the server-side apparatus 200A is increased ever under an environment that the wave state is deteriorated.

Referring to FIG. 2A, the terminal-side apparatus 100A has the input terminal 100a and the output terminal 100b. The terminal-side apparatus 100A comprises a waveform and signal reception portion 104, the speech detection portion 101, the waveform compression portion 102, the waveform transmission portion 103, and a waveform storing portion 105.

The waveform and signal reception portion 104 in the terminal-side apparatus 100A is supplied, from the input terminal 100a, with the speech data or the waveform data re-transmission request signal transmitted from the server-side apparatus 200A. That is, the waveform and signal reception portion 104 receives the waveform data of the inputted speech and the waveform data re-transmission request signal transmitted from the server-side apparatus 200A.

It is assumed that the speech data is inputted from the input terminal 100a. In this case, the received speech data is sent to the speech detection portion 101 from the waveform and signal reception portion 104. The speech detection portion 101 detects the speech of the waveform data sent from the waveform and signal reception portion 104. In other words, the speech detection portion 101 detects the speech interval of the waveform data received by the waveform and signal reception portion 104. The detection method may use the word spotting method or the like. The speech data detected by the speech detection portion 101 is sent to the waveform compression portion 102.

The waveform compression portion 102 compresses the waveform data sent from the speech detection portion 101. That is, the waveform compression portion 102 compresses the waveform data of the speech interval detected by the speech detection portion 101. The compressing method may use the VSELP method, PSI-CELP method, or the like. The waveform data compressed by the waveform compression portion 102 is sent to the waveform storing portion 105.

The waveform storing portion 105 sends, to the waveform transmission portion 103, the compressed waveform data sent from the waveform compression portion 102, and stores the same data. The waveform transmission portion 103 transmits, to the server-side apparatus 200A from the output terminal 100b, the compressed waveform data sent from the waveform storing portion 105. In other words, the waveform transmission portion 103 transmits the waveform data.

It is assumed that the waveform and signal reception portion 104 is supplied with the waveform data re-transmission request signal transmitted from the server-side apparatus 200A via the input terminal 100a. In this event, the waveform data re-transmission request signal received by the waveform and signal reception portion 104 is sent to the waveform storing portion 105. In response to the waveform data re-transmission request signal, the waveform storing portion 105 sends, to the waveform transmission portion 103, the compressed waveform data stored therein. The waveform transmission portion 103, from the output terminal 100b to the server-side apparatus 200A, the compressed waveform data sent from the waveform storing portion 105.

In other words, the waveform storing portion 105 temporarily stores, as stored waveform data, the waveform data compressed by the waveform compression portion 102 to send the stored waveform data to the waveform storing portion 103, and when the waveform and signal reception portion 104 receives the waveform data re-transmission request signal from the server-side apparatus 200A, the waveform storing portion sends, to the waveform transmission portion 103, the stored waveform data in response to the received waveform data re-transmission request signal.

Referring to FIG. 2B, the server-side apparatus 200A has the input terminal 200a, a recognition result output terminal 200b, and a signal output terminal 200c. The server-side apparatus 200A comprises a waveform reception portion 201A, the waveform decompression portion 202, a waveform data re-transmission request signal transmission portion 206, the analyzing portion 203, the recognizing portion 204, and the standard pattern storing portion 205.

In the server-side apparatus 200A, the waveform reception portion 201A, via the input terminal 200a, the compressed waveform data transmitted from the waveform transmission portion 103 in the terminal-side apparatus 100A. That is, the waveform reception portion 201A receives the compressed waveform data transmitted from the terminal-side apparatus 100A. The waveform reception portion 201A sends the received waveform data to the waveform decompression portion 202.

It is assumed that the reception of the compressed waveform data fails in the waveform reception portion 201. In this event, the waveform reception portion 201A sends such a message (a waveform data re-transmission request signal) to the waveform data re-transmission request signal transmission portion 206. The waveform data re-transmission request signal transmission portion 206, to the terminal-side apparatus 100A from the signal output terminal 200c, the waveform data re-transmission request signal sent from the waveform reception portion 201A. That is, when the reception of the compressed waveform data fails in the waveform reception portion 201A, the waveform data re-transmission request signal transmission portion 206 receives, from the waveform reception portion 201A, the waveform data re-transmission request signal and transmits, to the terminal-side apparatus 100A, the waveform data re-transmission request signal.

The waveform decompression portion 202 decompresses the compressed waveform data sent from the waveform reception portion 201A. That is, the waveform decompression portion 202 decompresses the waveform data received by the waveform reception portion 201A. The waveform data decompressed by the waveform decompression portion 202 is sent to the analyzing portion 203.

The analyzing portion 203 converts, into the characteristic vector, the waveform data decompressed by the waveform decompression portion 202. In other words, the analyzing portion 203 analyzes the speech by using the waveform data decompressed by the waveform decompression portion 202. The characteristic vector may use the cepstrum vector, Δcepstrum vector, or the like. The characteristic vector analyzed by the analyzing portion 203 is sent to the recognizing portion 204.

The recognizing portion 204 calculates the likelihood between the characteristic vector sent from the analyzing portion 203 and standard patterns sent from the standard pattern storing portion 205 so as to obtain a recognition result. That is, the recognizing portion 204 performs recognition processing based on an analysis result in the analyzing portion 203. The method for calculating the likelihood may use Viterbi algorithm, DP matching, or the like. The recognition result obtained by the recognizing portion 204 is outputted from the recognition result output terminal 200b.

At any rate, a combination of the analyzing portion 203, the recognizing portion 204, and the standard pattern storing portion 205 serves as recognizing means which performs the recognition processing by using the waveform data decompressed by the waveform decompression portion 202 to produce the recognition result.

According to the second embodiment, the speech recognition method comprises, in the server-side apparatus 200A, a step of transmitting the waveform data re-transmission request signal to the terminal-side apparatus 100A when the reception of the compressed waveform data transmitted from the terminal-side apparatus 100A fails in the server-side apparatus 200A, and, in the terminal-side apparatus 100A, a step of transmitting, to the server-side apparatus 200A, the waveform data stored in the waveform storing portion 105 when the terminal-side apparatus receives the waveform data re-transmission request signal transmitted from the server-side apparatus 200A.

THIRD EMBODIMENT

Figure 3A:
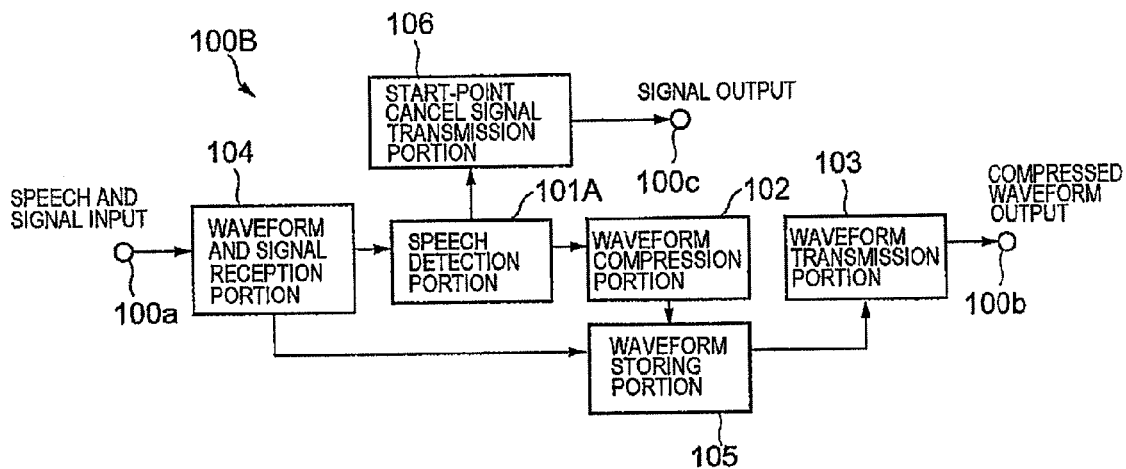
FIG. 3A is a block diagram showing a terminal side apparatus according to a third embodiment of the present invention.
Figure 3B:
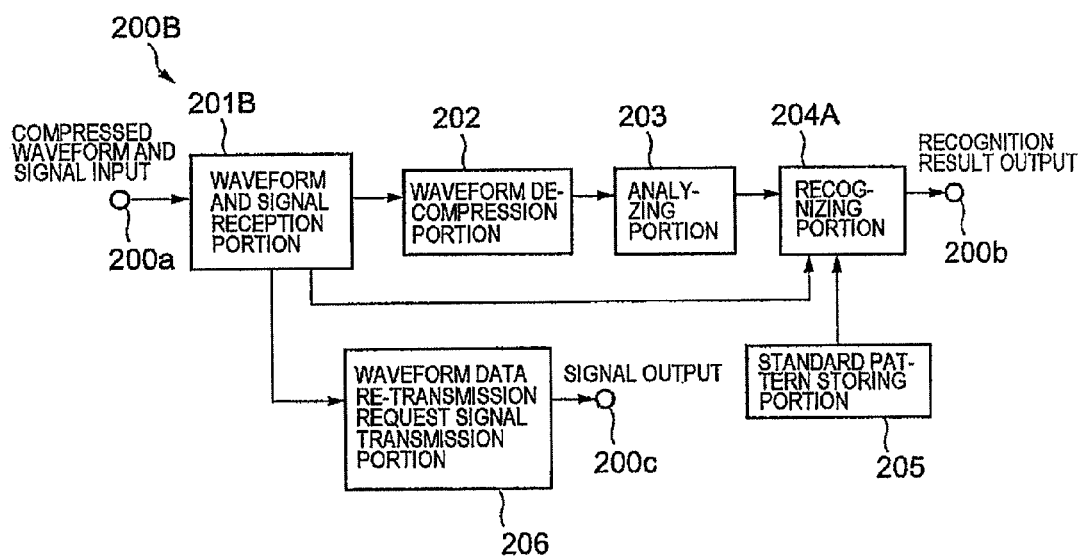
FIG. 3B is a block diagram showing a server side apparatus according to the third embodiment of the present invention.

Referring to FIGS. 3A and 3B, the description will proceed to a server-client type speech recognition apparatus according to a third embodiment of the present invention. FIG. 3A shows the structure of a terminal-side apparatus 100B. FIG. 3B shows the structure of a server-side apparatus 200B.

According to the third embodiment, a server-client type speech recognition apparatus has the structure according to the second embodiment, and further has the two following frames. According to a first frame, the terminal-side apparatus 100B detects the speech interval, the compressed waveform data is transmitted to the server-side apparatus 200B, and thereafter, when the start point of the speech is canceled, a start-point cancel signal is transmitted to the server-side apparatus 200B. According to a second frame, when the server-side apparatus 200B receives the start-point cancel signal, the recognition processing stops. With above-described structure, inasmuch as the recognition processing promptly can stop at the timing of canceling the start point, the unnecessary mount of storage and the amount of calculation can be omitted.

Referring to FIG. 3A, the terminal-side apparatus 100B has the input terminal 100a, a compressed waveform output terminal 100b, and a signal output terminal 100c. The terminal-side apparatus 100B comprises the waveform and signal reception portion 104, a speech detection portion 101A, the waveform compression portion 102, the waveform transmission portion 103, the waveform storing portion 105, and a start-point cancel signal transmission portion 106.

In the terminal-side apparatus 100B, the waveform and signal reception portion 104 is supplied, via the input terminal 100a, with the speech data or the waveform data re-transmission request signal transmitted from the server-side apparatus 200B. That is, the waveform and signal reception portion 104 receives the waveform data of the inputted speech and the waveform data re-transmission request signal transmitted from the server-side apparatus 200B. When the speech data is supplied to the waveform and signal reception portion 104 from the input terminal 100a, the waveform and signal reception portion 104 sends the received speech data to the speech detection portion 101A.

The speech detection portion 101A detects the speech of the received waveform data sent from the waveform and signal reception portion 104. In other words, the speech detection portion 101A detects the speech interval of the waveform data of the speech received by the waveform and signal reception portion 104. The detecting method may use the word spotting method or the like. The speech data detected by the speech detection portion 101A is sent to the waveform compression portion 102.

It is assumed that, after detecting the speech, the detection is canceled. In this event, the speech detection portion 101A sends a signal at the timing of canceling the start point (a start-point cancel signal) to the start-point cancel signal transmission portion 106. The start-point cancel signal transmission portion 106 receives the transmitted signal at the timing of canceling the start point and, then, transmits the start-point cancel signal to the server-side apparatus 200B from the signal output terminal 100c. That is, when the speech detection portion 101A detects the speech and thereafter the detection is canceled, the start-point cancel signal transmission portion 106 receives the signal at the timing of canceling the start point transmitted from the speech detection portion 101A, and transmits the start-point cancel signal to the server-side apparatus 200B.

The waveform compression portion 102 compresses the waveform data sent from the speech detection portion 101A. That is, the waveform compression portion 102 compresses the waveform data of the speech interval detected by the speech detection portion 101A. The compressing method may use the VSELP method, PSI-CELP method, or the like. The waveform data compressed by the waveform compression portion 102 is sent to the waveform storing portion 105.

The waveform storing portion 105 sends, to the waveform transmission portion 103, the compressed waveform data sent from the waveform compression portion 102, and stores the same data. The waveform transmission portion 103 transmits, to the server-side apparatus 200B from the compressed waveform output terminal 100b, the compressed waveform data sent from the waveform compression portion 102 via the waveform storing portion 105.

It is assumed that the waveform and signal reception portion 104 is supplied with the waveform data re-transmission request signal transmitted via the input terminal 100a from the server-side apparatus 200B. In this event, the received waveform data re-transmission request signal is delivered to the waveform storing portion 105 from the waveform and signal reception portion 104. Responsive to the waveform data re-transmission request signal, the waveform storing portion 105 sends, to the waveform transmission portion 103, the compressed waveform data which is stored therein. The waveform transmission portion 103 transmits, to the server-side apparatus 200B, the compressed waveform data sent from the waveform storing portion 105.

In other words, the waveform storing portion 105 temporarily stores, as the stored waveform data, the waveform data compressed by the waveform compression portion 102 to send the stored waveform data to the waveform transmission portion 103, and when the waveform and signal reception portion 104 receives the waveform data re-transmission request signal from the server-side apparatus 200B, the waveform storing portion sends, to the waveform transmission portion 103, the stored waveform data in response to the received waveform data re-transmission request signal.

Referring to FIG. 3B, the server-side apparatus 200B has the input terminal 200a, the recognition result output terminal 200b, and the signal output terminal 200c. The server-side apparatus 200B comprises a waveform and signal reception portion 201B, the waveform decompression portion 202, the waveform data re-transmission request signal transmission portion 206, the analyzing portion 203, a recognizing portion 204A, and the standard pattern storing portion 205.

In the server-side apparatus 200B, the waveform and signal reception portion 201B receives, via the input terminal 200a, the compressed waveform data transmitted from the waveform transmission portion 103 in the terminal-side apparatus 100B or the signal at the timing of canceling the start point (the start-point cancel signal) transmitted from the start-point cancel signal transmission portion 106. That is, the waveform and signal reception portion 201B receives the compressed waveform data and the start-point cancel signal which are transmitted from the terminal-side apparatus 100B.

The waveform and signal reception portion 201B sends the received compressed waveform data to the waveform decompression portion 202. When the reception of the compressed waveform data fails, the waveform and signal reception portion 201B sends such a message (the waveform data re-transmission request signal) to the waveform data re-transmission request signal transmission portion 206. The waveform data re-transmission request signal transmission portion 206 transmits, to the terminal-side apparatus 100B from the signal output terminal 200c, the waveform data re-transmission request signal sent from the waveform and signal reception portion 201B. That is, when the reception of the compressed waveform data fails in the waveform and signal reception portion 201B, the waveform data re-transmission request signal transmission portion 206 receives the re-transmission request signal for the waveform data from the waveform and signal reception portion 201B and transmits, to the terminal-side apparatus 100B from the signal output terminal 200c, the waveform data re-transmission request signal.

The waveform decompression portion 202 decompresses the compressed waveform data sent from the waveform and signal reception portion 201B. That is, the waveform decompression portion 202 decompresses the waveform data of the speech received by the waveform and signal reception portion 201B. The waveform data decompressed by the waveform decompression portion 202 is sent to the analyzing portion 203.

The analyzing portion 203 converts, into the characteristic vector, the waveform data decompressed by the waveform decompression portion 202. In other words, the analyzing portion 203 analyzes the speech by using the waveform data decompressed by the waveform decompression portion 202. The characteristic vector may use the cepstrum vector, Δcepstrum vector, or the like. The characteristic vector analyzed by the analyzing portion 203 is sent to the recognizing portion 204A.

The recognizing portion 204A calculates the likelihood between the characteristic vector sent from the analyzing portion 203 and standard patterns sent from the standard pattern storing portion 205 so as to obtain a recognition result. That is, the recognizing portion 204A performs recognition processing based on the analysis result in the analyzing portion 203. The method for calculating the likelihood may use Viterbi algorithm, DP matching, or the like. The recognition result obtained by the recognizing portion 204A is outputted from the recognition result output terminal 200b.

It is assumed that the waveform and signal reception portion 201B is supplied with the signal at the timing of canceling the start point transmitted from the start-point cancel signal transmission portion 106 via the input terminal 200a. In this event, the received signal at the timing of canceling start-point is sent to the recognizing portion 204A from the waveform and signal reception portion 201B. When the signal at the timing of canceling the start point (the start-point cancel signal) is sent from the waveform and signal reception portion 201B, the recognizing portion 204A stops the recognition in the halfway. In other words, when the waveform and signal reception portion 201B receives the start-point cancel signal, the recognizing portion 204A stops the recognition processing.

At any rate, a combination of the analyzing portion 203, the recognizing portion 204A, and the standard pattern storing portion 205 serves as recognizing means which produces the recognition result by using the waveform data decompressed by the waveform decompression portion 202 and stops the recognition processing in response to the start-point cancel signal received by the waveform and signal reception portion 201B.

According to the third embodiment, the speech recognition method comprises, in the terminal-side apparatus 100B, a step of, when the speech is detected and thereafter the detection is canceled, transmitting the start-point cancel signal to the server-side apparatus 200B, and, in the server-side apparatus 200B, a step of, when the server-side apparatus receives the start-point cancel signal from the terminal-side apparatus 100B, stopping the recognition processing.

FOURTH EMBODIMENT

Figure 4A:
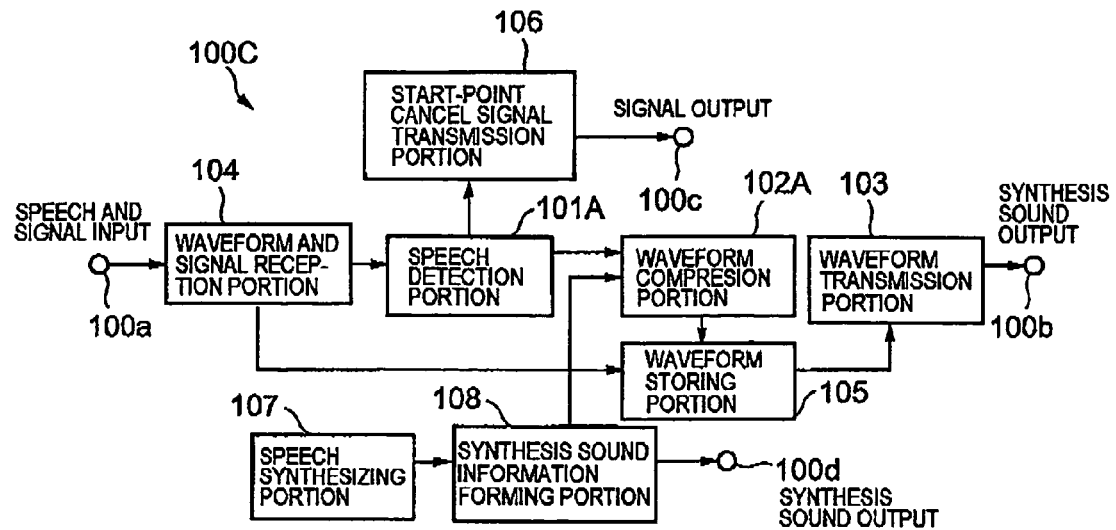
FIG. 4A is a block diagram showing a terminal side apparatus according to a fourth embodiment of the present invention.
Figure 4B:
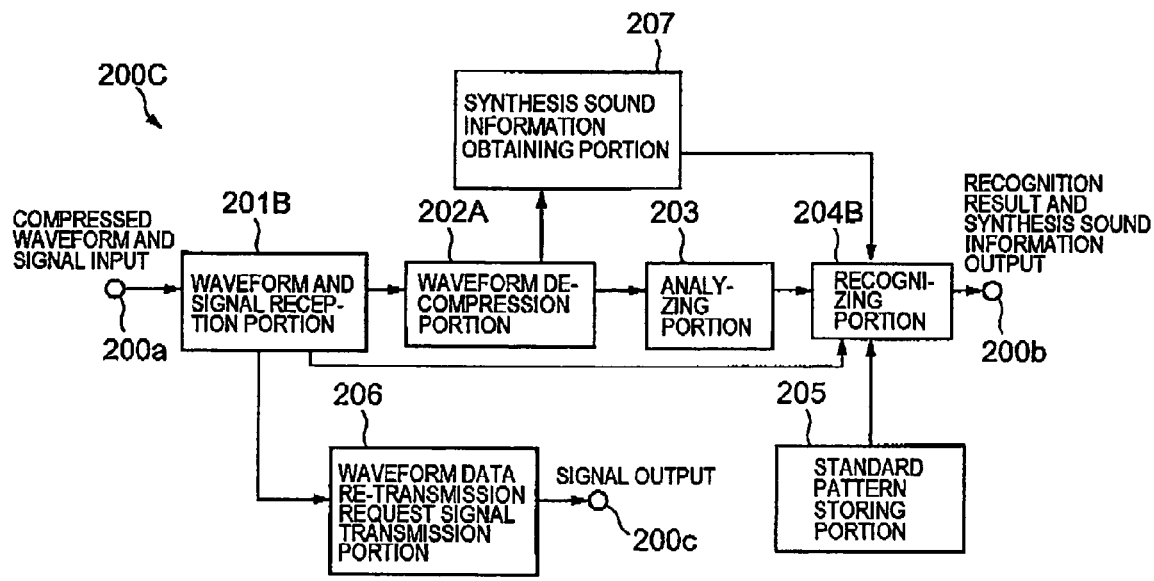
FIG. 4B is a block diagram showing a server side apparatus according to the fourth embodiment of the present invention.

Referring to FIGS. 4A and 4B, the description will proceed to a server-client type speech recognition apparatus according to a fourth embodiment of the present invention. FIG. 4A shows the structure of a terminal-side apparatus 100C. FIG. 4B shows the structure of a server-side apparatus 200C.

According to the fourth embodiment, a server-client type speech recognition apparatus has the structure according to the third embodiment, and further has the two following frames. According to a first frame, in the terminal-side apparatus 100C, a synthesis sound is generated and is outputted, information on the synthesis sound is incorporated as a part of the waveform data, and the generated data is transmitted to the server-side apparatus 200C. According to a second frame, when the server-side apparatus 200C separates the data transmitted from the terminal-side apparatus 100C into the waveform data and another information, obtains the information on the synthesis sound from the other information, and forms a corresponding relationship between the synthesis sound and the recognition result obtained from the waveform data.

Referring to FIG. 4A, the terminal-side apparatus 100C has the input terminal 100a, the compressed waveform output terminal 100b, the signal output terminal 100c, and a synthesis sound output terminal 100d. The terminal-side apparatus 100C comprises the waveform and signal reception portion 104, the speech detection portion 101A, a waveform compression portion 102A, the waveform transmission portion 103, the waveform storing portion 105, the start-point cancel signal transmission portion 106, a speech synthesizing portion 107, and a synthesis sound information forming portion 108.

In the terminal-side apparatus 10C, the waveform and signal reception portion 104 is supplied, via the input terminal 100a, with the speech data or the waveform data re-transmission request signal transmitted from the server-side apparatus 200C. When the speech data is supplied to the waveform and signal reception portion 104 via the input terminal 100a, the waveform and signal reception portion 104 sends the received speech data to the speech detection portion 101A. The speech detection portion 101A detects the speech of the received waveform data sent from the waveform and signal reception portion 104. The detecting method may use the word spotting method or the like. The speech data detected by the speech block 101A for detecting the speech is transmitted to the block 102A for compressing the waveform.

It is assumed that, after detecting the speech, the detection is canceled in the speech detection portion 101A. In this event, the speech detection portion 101A sends the signal at the timing of canceling the start point (the start-point cancel signal) to the start-point cancel signal transmission portion 106. The start-point cancel signal transmission portion 106 transmits the sent signal at the timing of canceling the start point (the start-point cancel signal) to the server-side apparatus 200C from the signal output terminal 100c.

According to the fourth embodiment, the terminal-side apparatus 100C has the speech synthesizing portion 107 for synthesizing a synthesis sound. The synthesis sound synthesized by the speech synthesizing portion 107 is sent to the synthesis sound information forming portion 108. The synthesis sound information forming portion 108 forms information on the synthesis sound, sends the formed synthesis sound information to the waveform compression portion 102A, and outputs the synthesis sound sent from the speech synthesizing portion 107 from the synthesis sound output terminal 100d. That is, the synthesis sound information forming portion 108 forms the information on the synthesis sound synthesized by the speech synthesizing portion 107 to produce the synthesis speech.

The information on the synthesis sound uses the contents of the synthesis sound, time stamp information upon outputting the synthesis sound, or the like.

The waveform compression portion 102A compresses the waveform data sent from the speech detection portion 101A and contains the synthesis sound information obtained by the synthesis sound information forming portion 108 as a part of the compressed waveform data. That is, the waveform compression portion 102A compresses the waveform data of the speech interval detected by the speech detection portion 101A, and includes, as a part of the compressed waveform data, the synthesis sound information formed by the synthesis sound information forming portion 108.

The method for including the synthesis sound information as a part of the waveform data uses a method for containing the synthesis sound information in a header of the waveform data and compressing it, a method for adding the synthesis sound information to the compressed waveform data, or the like.

The compressing method in the waveform compression portion 102A uses the VSELP method, the PSI-CELP method, or the like. The compressed waveform data is sent to the waveform storing portion 105. The waveform storing portion 105 sends, to the waveform transmission portion 103, the compressed waveform data sent from the waveform compression portion 102A, and stores the same data therein. The waveform transmission portion 103 transmits, to the server-side apparatus 200C from the compressed waveform output terminal 100b, the compressed waveform data sent from the waveform compression portion 102A via the waveform storing portion 105.

It is assumed that the waveform and signal reception portion 104 is supplied, via the input terminal 100a, with the waveform data re-transmission request signal transmitted from the server-side apparatus 200C. In this event, the waveform and signal reception portion 104 sends the received waveform data re-transmission request signal to the waveform storing portion 105. Responsive to the waveform data re-transmission request signal, the waveform storing portion 105 sends, to the waveform transmission portion 103, the compressed waveform data which is stored therein. The waveform transmission portion 103 transmits, from the compressed waveform output terminal 100b to the server-side apparatus 200C, the compressed waveform data sent from the waveform storing portion 105.

Referring to FIG. 4B, the server-side apparatus 200C has the input terminal 200a, a recognition result and synthesis sound information output terminal 200b, and the signal output terminal 200c. The server-side apparatus 200C comprises a waveform and signal reception portion 201B, a waveform decompression 202A, the waveform data re-transmission request signal transmission portion 206, the analyzing portion 203, a recognizing portion 204B, the standard pattern storing portion 205, and a synthesis sound information obtaining portion 207.

In the server-side apparatus 200C, the waveform and signal reception portion 201B receives, via the input terminal 200a, the compressed waveform data transmitted from the waveform transmission portion 103 in the terminal-side apparatus 100C or the signal at the timing of canceling the start point (the start-point cancel signal) transmitted from the start-point cancel signal transmission portion 106. The waveform and signal reception portion 201B sends the received compressed waveform data to the waveform decompression portion 202A. When the reception of the compressed waveform data fails in the waveform and signal reception portion 204, the waveform and signal reception portion 201B sends the waveform data re-transmission request signal to the waveform data re-transmission request signal transmission portion 206. The waveform data re-transmission request signal transmission portion 206 transmits, from the signal output terminal 200c to the terminal-side apparatus 100C, the waveform data re-transmission request signal sent from the waveform and signal reception portion 201B.

The waveform decompression portion 202A separates the data sent from the waveform and signal reception portion 201B into the synthesis sound information of the waveform data and another information, and decompresses the compressed waveform data. The decompressed waveform data is sent to the analyzing portion 203. The other information is sent to the synthesis sound information obtaining portion 207.

The synthesis sound information obtaining portion 207 obtains the synthesis sound information from the information sent from the waveform decompression portion 202A. That is, the synthesis sound information obtaining portion 207 obtains the synthesis sound information from the data decompressed by the waveform decompression portion 202A.

The analyzing portion 203 converts, into the characteristic vector, the waveform data decompressed by the waveform decompression portion 202A. The characteristic vector may use the cepstrum vector, Δcepstrum vector, or the like. The characteristic vector analyzed by the analyzing portion 203 is sent to the recognizing portion 204B. The recognizing portion 204B calculates the likelihood between the characteristic vector sent from the analyzing portion 203 and standard patterns sent from the standard pattern storing portion 205 so as to obtain a recognition result. The method for calculating the likelihood may use Viterbi algorithm, DP matching, or the like.

The calculated recognition result and the synthesis sound information obtained by the synthesis sound information obtaining portion 207 are transmitted to the terminal-side apparatus 100C via the recognition result and synthesis sound information output terminal 200d from the recognizing portion 204B. Alternatively, the calculated recognition result and the synthesis sound information obtained by the synthesis sound information obtaining portion 207 may have a corresponding relationship and, therefore, the recognition result is associated with the synthesis sound. The associated recognition result may be transmitted to the terminal-side apparatus 100C via the recognition result and synthesis sound information output terminal 200b from the recognizing portion 204B. That is, the recognizing portion 204B associates the synthesis sound with the recognition result based on the synthesis sound information obtained by the synthesis sound information obtaining portion 208 upon ending the recognition to produce the associated recognition result or the recognition result and the synthesis sound information.

It is assumed that the waveform and signal reception portion 201B is supplied, via the input terminal 200a, with the signal at the timing of canceling the start point (the start-point cancel signal) transmitted from the start-point cancel signal transmission portion 106. In this event, the received signal at the timing of canceling the start point (the start-point cancel signal) is sent to the recognizing portion 204B from the waveform and signal reception portion 201B. When the signal at the timing of canceling the start point (the start-point cancel signal) is sent from the waveform and signal reception portion 201B, the recognizing portion 204B stops the recognition in the halfway.

At any rate, a combination of the analyzing portion 203, the recognizing portion 204B, and the standard pattern storing portion 205 serves as recognizing means which performs the recognition processing by using the waveform data decompressed by the waveform decompression portion 202A to produce the recognition result, and stops the recognition processing in response to the start-point cancel signal received by the waveform and signal reception portion 201B. The recognizing means associates the synthesis sound with the recognition result based on the synthesis sound information obtained by the synthesis sound information obtaining portion 207 upon ending the recognition to produce the associated recognition result or the recognition result and the synthesis sound information.

According to the fourth embodiment of this invention, the synthesis sound information may use various information such as the contents of the synthesis sound, time stamp information upon outputting the synthesis sound, a status number of the communication upon outputting the synthesis sound, or the like.

The method for including the synthesis sound information as a part of the waveform data may use a method for containing the synthesis sound information in a header of the waveform data and compressing it, a method for adding the synthesis sound information to the compressed waveform data, or the like.

When the synthesis sound information is not transmitted to the server-side apparatus 200C and when transmission of the waveform data from the terminal-side apparatus 100C to the server-side apparatus 200C fails, there is a problem that it is impossible to determine the waveform data having the successful next transmission is the speech outputted to which synthesis sound.

The problem is solved according to the fourth embodiment. The synthesis sound information and the waveform data have a one-to-one corresponding relationship, thereby always having the corresponding relationship between the recognition result and synthesis sound. The conversation system without errors in the status transition can be structured.

According to the fourth embodiment, the speech recognition method comprises, in the terminal-side apparatus 100C, a step of synthesizing the synthesis sound, a step of forming the information on the synthesis sound to produce the synthesis sound, a step of compressing the waveform data at the detected speech interval to transmit it to the server-side apparatus 200C with the synthesis sound information formed by the synthesis sound information forming portion 108 contained in a part of the waveform data, and, in the server-side apparatus 200C, a step of obtaining the synthesis sound information from the decompressed data. Upon ending the recognition, the synthesis sound and the recognition result are associated with each other based on the obtained synthesis sound information to produce the associated recognition result or the recognition result and the synthesis sound information.

FIFTH EMBODIMENT

Figure 5A:
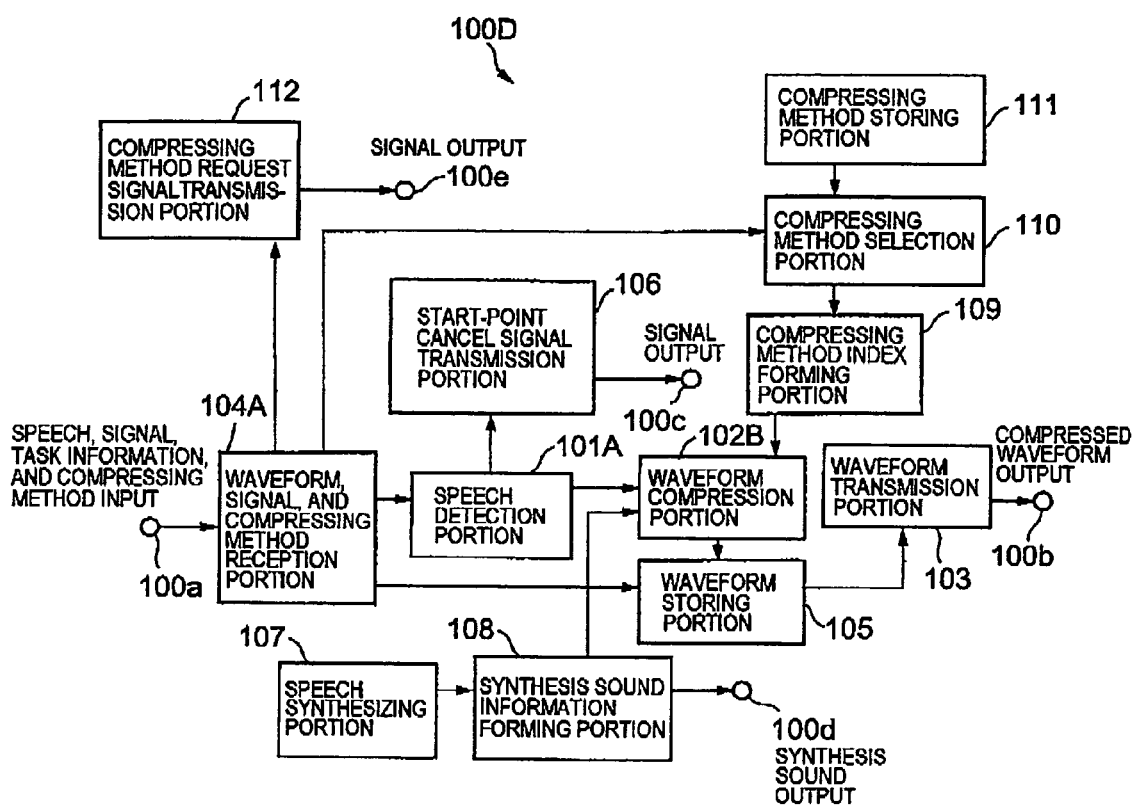
FIG. 5A is a block diagram showing a terminal side apparatus according to a fifth embodiment of the present invention.
Figure 5B:
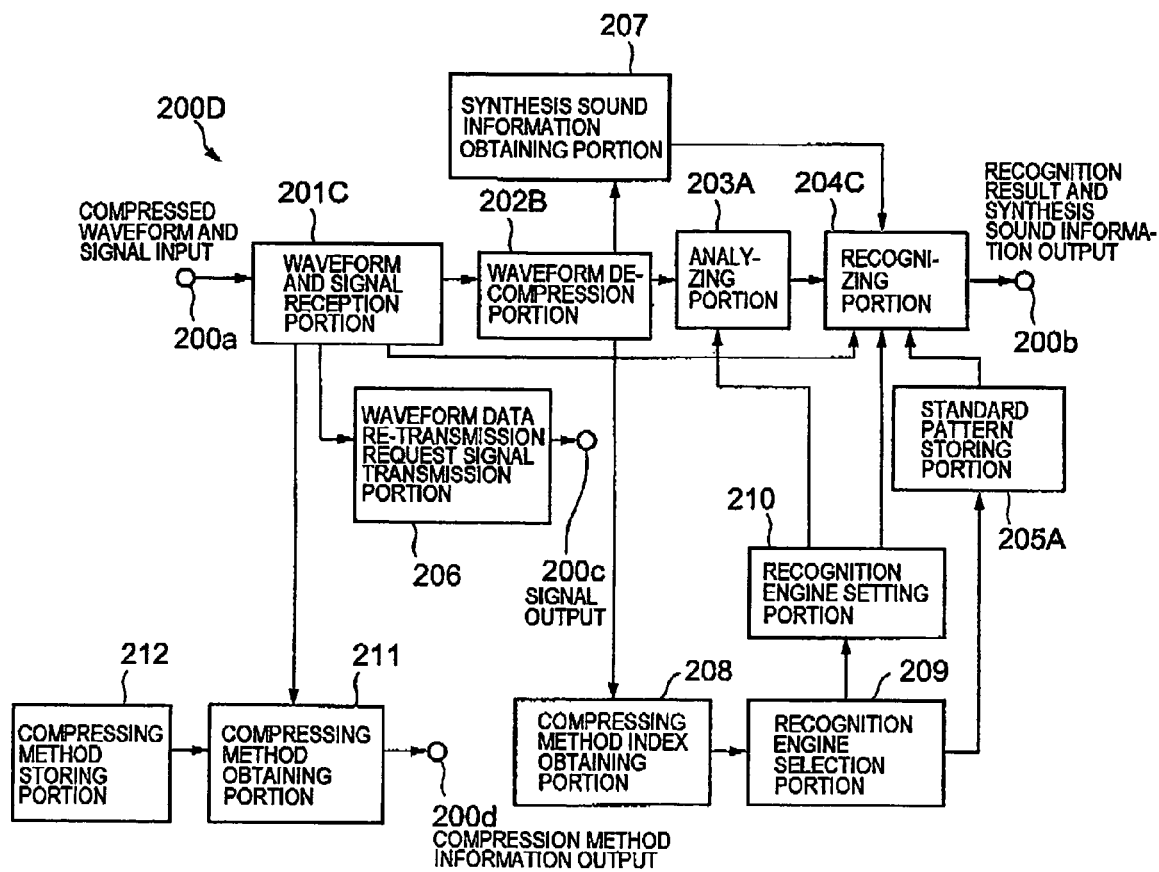
FIG. 5B is a block diagram showing a server side apparatus according to the fifth embodiment of the present invention.

Referring to FIGS. 5A and 5B, the description will proceed to a server-client type speech recognition apparatus according to a fifth embodiment of the present invention. FIG. 5A shows the structure of a terminal-side apparatus 100D. FIG. 5B shows the structure of a server-side apparatus 200D.

According to the fifth embodiment, the server-client type speech recognition system has the structure according to the fourth embodiment, and further has the two following frames. According to a first frame, when the terminal-side apparatus 100D transmits a signal for requesting a compressing method to the server-side apparatus 200D and when the server-side apparatus 200D receives the signal for requesting the compressing method, the server-side apparatus 200D transmits available compressing method information to the terminal-side apparatus 100D and the terminal-side apparatus 100D selects an optimum compressing method based on the compression information transmitted from the server-side apparatus 200D and the available compressing method in the terminal-side apparatus 100D. According to a second frame, the synthesis sound information and an index of the compression information selected by the terminal-side apparatus 100D are included in a part of the waveform data, and the formed data is transmitted to the server-side apparatus 200D, the server-side apparatus 200D separates the data into the waveform data and another data, separates the other data after separation into the synthesis sound information and the index of the compression method, selects an optimum recognition engine for the compression method based on index information of the compression method, and produces the recognition result by using a analyzing method for the selected recognition engine, a recognizing method, and a standard pattern.

Referring to FIG. 5A, the terminal-side apparatus 100D has the input terminal 100a, the compressed waveform output terminal 100b, a first signal output terminal 100c, the signal output terminal 100d of the synthesis sound, the synthesis sound output terminal 100d, and a second signal output terminal 100e. The terminal-side apparatus 100D comprises a waveform, signal, and compressing method reception portion 104A, the speech detection portion 101A, a waveform compression portion 102B, the waveform transmission portion 103, the waveform storing portion 105, the start-point cancel signal transmission portion 106, a speech synthesizing portion 107, the synthesis sound information forming portion 108, a compressing method index forming portion 109, a compressing method selection portion 110, a compressing method storing portion 111, and a compressing method request signal transmission portion 112.

In the terminal-side apparatus 100D, the waveform, signal, and compressing method reception portion 104A is supplied, via the input terminal 100a, with the speech data, the compressing method request signal, the transmission data re-transmission request signal transmitted from the server-side apparatus 200D, or the compressing method information transmitted from the server-side apparatus 200D. That is, the waveform, signal, and compressing method reception portion 104A receives the inputted speech data, the inputted compressing method request signal, the waveform data re-transmission request signal transmitted from the server-side apparatus 200D, and the compressing method information available to the sever-side apparatus 200D that is transmitted from the server-side apparatus 200D.

It is assumed that the waveform, signal, and compressing method reception portion 104A is supplied with the compressing method request signal. In this event, the received compressing method request signal is sent to the compressing method request signal transmission portion 112 from the waveform, signal, and compressing method reception portion 104A. The compressing method request signal transmission portion 112 transmits, via the second signal output terminal 100e to the server-side apparatus 200D, the compressing method request signal sent from the waveform, signal, and compressing method reception portion 104A.

It is assumed that the waveform, signal, and compressing method reception portion 104A is supplied with the compressing method information transmitted from the server-side apparatus 200D. In this event, the received compressing method information is sent to the compressing method selection portion 110 from the waveform, signal, and compressing method reception portion 104A.

According to this embodiment, the terminal-side apparatus 100D comprises the compressing method storing portion 111 for storing available compressing methods, and the compressing method selection portion 110 for selecting a method of compressing the waveform.

The compressing method stored in the compressing method storing portion 111 includes a waveform compressing method (full rate, half rate, and the like), information of wavebands (4 kHz, 8 kHz, and the like), and so on.

The compressing method selection portion 110 selects the compressing method having the large amount of information of the data, based on the compressing method information stored in the compressing method storing portion 111 and the compressing method information available to the server-side apparatus 200D that is sent from the waveform, signal, and compressing method reception portion 104A. For example, when the terminal-side apparatus 100D and the server-side apparatus 200D have the full-rate and half-rate compressing methods, the full rate having the large amount of information of the data is selected. When the waveform, signal, and compressing method reception portion 104A receives the compressing method information available to the server-side apparatus 200D, the compressing method selection portion 110 selects an optimum compressing method based on the compressing method information sent from the waveform, signal, and compressing method reception portion 104A. A compressing name selected by the compressing method selection portion 110 is sent to the compressing method index forming portion 109.

The compressing method index forming portion 109 forms an index of the compressing name selected by the compressing method selection portion 110. At any rate, the compressing method index forming portion 109 forms the index of the compressing method selected by the compressing method selection portion 110. The index formed by the compressing method index forming portion 109 is sent to the waveform compression portion 103B.

It is assumed that the waveform, signal, and compressing method reception portion 104A is supplied with the speech data. In this event, the received speech data is sent to the speech detection portion 101A from the waveform, signal, and compressing method reception portion 104A. The speech detection portion 101A detects the speech of the waveform data sent from the waveform, signal, and compressing method reception portion 104A. At any rate, the speech detection portion 101A detects the speech interval of the waveform data received by the waveform, signal, and compressing method reception portion 104A. The detection method uses the word spotting method and the like. The detected speech data is sent to the waveform compression portion 102B from the speech detection portion 101A.

It is assumed that the detection is canceled after detecting the speech in the speech detection portion 101A. In this event, the signal at the timing of canceling the start point (the start-point cancel signal) is sent to the start-point cancel signal transmission portion 106 from the speech detection portion 101A. The start-point cancel signal transmission portion 106 transmits, to the server-side apparatus 200D from the first signal output terminal 100c, the transmitted signal at the timing of canceling the start point (the start-point cancel signal).

According to the fifth embodiment, similarly to the fourth embodiment, the terminal-side apparatus 100D has the speech synthesizing portion 107 for forming the synthesis sound. The synthesis sound formed by the speech synthesizing portion 107 is sent to the synthesis sound information forming portion 108.

The synthesis sound information forming portion 108 forms the synthesis sound information, sends the formed synthesis sound information to the waveform compression portion 103B, and produces the synthesis sound sent from the speech synthesizing portion 107. The synthesis sound information uses the contents of the synthesis sound, the time stamp information outputting the synthesis sound, and the like.

The waveform compression portion 102B compresses the waveform data sent from the speech detection portion 101A, and includes, as a part of the waveform data, the synthesis sound information formed by the synthesis sound information forming portion 108 and the index of the compressing method formed by the compressing method index forming portion 109. At any rate, the waveform compression portion 102B compresses the waveform data at the speech interval detected by the speech detection portion 101A, and includes, as a part of the waveform data, the synthesis sound information formed by the synthesis sound information forming portion 108 and the compressing method index formed by the compressing method index forming portion 109.

The method for including the synthesis sound information and the index of the compressing method as a part of the waveform data uses a method for containing the synthesis sound information and the index of the compressing method in a header of the waveform data and compressing them, a method for adding the synthesis sound information and the index of the compressing method to the compressed waveform data, or the like. The compressing method uses the VSELP method, the PSI-CELP method, or the like. The waveform data compressed by the waveform compression portion 102B is sent to the waveform storing portion 105.

The waveform storing portion 105 sends, to the waveform transmission portion 103, the compressed waveform data sent from the waveform compression portion 102B, and stores the same data therein.

The waveform transmission portion 103 transmits, to the server-side apparatus 200D, the compressed waveform data sent from the waveform compression portion 102B via the waveform storing portion 105. It is assumed that the waveform, signal, and compressing method reception portion 104A is supplied with the waveform data re-transmission request signal transmitted from the server-side apparatus 200D. In this event, the received waveform data re-transmission request signal is sent to the waveform storing block 105 from the waveform, signal, and compressing method reception portion 104A. Responsive to the received waveform data re-transmission request signal, the waveform storing portion 105 sends, to the waveform transmission portion 103, the compressed waveform data which is stored therein. The waveform transmission portion 103 transmits, to the server-side apparatus 200D, the compressed waveform data sent from the waveform storing portion 105.

At any rate, the waveform storing portion 105 temporarily stores, as the stored waveform data, the waveform data compressed by the waveform compression portion 102B to send the stored waveform data to the waveform transmission portion 103 Further, when the waveform, signal, and compressing method reception portion 104A receives the waveform data re-transmission request signal from the server-side apparatus 200D, the waveform storing portion sends the stored waveform data to the waveform transmission portion 103 in response to the received waveform data re-transmission request signal.

Referring to FIG. 5B, the server-side apparatus 200D has the input terminal 200a, the recognition result and synthesis sound information output terminal 200b, the signal output terminal 200c, and a compressing method information output terminal 200d. The server-side apparatus 200D comprises a waveform and signal reception portion 201C, a waveform decompression portion 202B, the waveform data re-transmission request signal transmission portion 206, an analyzing portion 203A, a recognizing portion 204C, a standard pattern storing portion 205A, the synthesis sound information obtaining portion 207, a compressing method index obtaining portion 208, a recognition engine selection portion 209, a recognition engine setting portion 210, a compressing method obtaining portion 211, and a compressing method storing portion 212.

In the server-side apparatus 200D, the waveform and signal reception portion 210C receives the compressed waveform data transmitted from the waveform transmission portion 103 in the terminal-side apparatus 100D, the signal at the timing of canceling the start point (the start-point cancel signal) transmitted from the start-point cancel signal transmission portion 106, or the waveform compressing method request signal transmitted from the compressing method request signal transmission portion 112. At any rate, the waveform and signal reception portion 201C receives the compressed waveform data transmitted from the terminal-side apparatus 100D and the waveform compressing method request signal.

It is assumed that the waveform and signal reception portion 201C receives the waveform compressing method request signal. In this event, the waveform and signal reception portion 201C sends the received waveform compressing method request signal to the compressing method obtaining portion 211.

When the received waveform compressing method request signal is send from the waveform and signal reception portion 201C, the compressing method obtaining portion 211 obtains the compressing method available to the server-side apparatus 200D from the compressing methods stored in the compressing method storing portion 212, and transmits the obtained compressing method information to the terminal-side apparatus 100D from the compressing method information output terminal 200d. At any rate, the compressing method storing 212 stores the information on the compressing methods available to the server-side apparatus 200D. When the compressing method request signal is sent from the waveform and signal reception portion 201C, the compressing method obtaining portion 211 obtains the compressing method information stored in the compressing method storing portion 212 and transmits the compressing method information to the terminal-side apparatus 100D.

When the waveform and signal reception portion 201C receives the waveform data, the waveform and signal reception portion 201C sends the received waveform data to the waveform decompression portion 202B.

It is assumed that the reception of the waveform data fails in the waveform and signal reception portion 201C. In this event, the waveform and signal reception portion 201C sends the waveform data re-transmission request signal to the waveform data re-transmission request signal transmission portion 206. The waveform data re-transmission request signal transmission portion 206 transmits, from the signal output terminal 200c to the terminal-side apparatus 100D, the waveform data re-transmission request signal sent from the waveform and signal reception portion 201C. At any rate, when the reception of the compressed waveform data fails in the waveform and signal reception portion 201C, the waveform data re-transmission request signal transmission portion 206 receives the re-transmission request signal of the waveform data from the waveform and signal reception portion 201C and transmits the waveform data re-transmission request signal to the terminal-side apparatus 100D.

The waveform decompression portion 202B separates the data sent from the waveform and signal reception portion 201C into the waveform data and another data, and decompresses the waveform data. At any rate, the waveform decompression portion 202B decompresses the waveform data of the speech received by the waveform and signal reception portion 201C.

The other information is transmitted to the synthesis sound information obtaining portion 207 and the compressing method index obtaining portion 208 from the waveform decompression portion 202B. The decompressed waveform data is sent from the waveform decompression portion 202B to the analyzing portion 203A. The synthesis sound information obtaining portion 207 obtains the synthesis sound information from the information sent from the waveform decompression portion 202B. The obtained synthesis sound information is sent to the recognizing portion 204C from the synthesis sound information obtaining portion 207.

The compressing method index obtaining portion 208 obtains the index of the compressing method from the information sent from the waveform decompression portion 202B. At any rate, the compressing method index obtaining portion 208 obtains the index of the compressing method from the data decompressed by the waveform decompression portion 202B. The index obtained by the compressing method index obtaining portion 208 is sent to the recognition engine selection portion 209.

The recognition engine selection portion 209 selects the recognition engine for recognition based on the index obtained by the compressing method index obtaining portion 208. At any rate, the recognition engine selection portion 209 selects the recognition engine from the index of the compressing method obtained by the compressing method index obtaining portion 208. The information for the engine selected by the recognition engine selection portion 209 is sent to the recognition engine setting portion 210 and the standard pattern storing portion 205A.

The recognition engine setting portion 210 sends the analysis method of the used engine to the analyzing portion 203A based on the engine information sent from the recognition engine selection portion 209, and transmits the recognition method to the recognizing portion 204C. At any rate, the recognition engine setting portion 210 sets, from stored engines, the engine selected by the recognition engine selection portion 209.

The standard pattern storing portion 205A sets the used standard pattern from the engine information sent from the recognition engine selection portion 209.

The analyzing portion 203A converts, into the characteristic vector, the waveform data decompressed by the waveform decompression portion 202B. At any rate, the analyzing portion 203A analyzes the speech by using the waveform data decompressed by the waveform decompression portion 202B. The characteristic vector uses the cepstrum vector, $\Delta$cepstrum vector, or the like. The characteristic vector analyzed by the analyzing portion 203A is sent to the recognizing portion 204C.

The recognizing portion 204C calculates the likelihood between the characteristic vector sent from the analyzing portion 203A and standard patterns sent from the standard pattern storing portion 205A so as to obtain a recognition result. At any rate, the recognizing portion 204C performs recognition processing based on the analysis result to produce the recognition result. The method for calculating the likelihood uses Viterbi algorithm, DP matching, or the like. The calculated recognition result and the synthesis sound information obtained by the synthesis sound information obtaining portion 207 are transmitted to the terminal-side apparatus 100D. Alternatively, the both are associated with each other, thus the corresponding relationship is established between the recognition result and the synthesis sound, and the associated recognition result is transmitted to the terminal-side apparatus 100D from the recognition result and synthesis sound information output terminal 200b.

It is assumed that the waveform and signal reception portion 201C is supplied with the signal at the timing of canceling the start point (the start-point cancel signal) transmitted from the start-point cancel signal transmission portion 106. In this event, the received signal at the timing of canceling the start point (the start-point cancel signal) is sent to the recognizing portion 204C from the waveform and signal reception portion 201C. When the received signal at the timing of canceling the start point (the start-point cancel signal) is sent from the waveform and signal reception portion 201C, the recognizing portion 204C stops the recognition in the halfway.

At any rate, a combination of the analyzing portion 203A, the recognizing portion 204C, and the standard pattern storing portion 205A is operable as recognizing means which performs the recognition processing by using the waveform data decompressed by the waveform decompression portion 202B to produce the recognition result. Further, when the recognition ends, the recognizing means associates the synthesis sound and the recognition result from the synthesis sound information obtained from the synthesis sound information obtaining portion 207 to produce the associated recognition result or the recognition result and the synthesis sound information.

The compressing method stored in the compressing method storing portions 111 and 212 in the terminal-side apparatus 100D and the server-side apparatus 200D includes a waveform compressing method (full rate, half rate, and the like), information of wavebands (4 kHz, 8 kHz, and the like), and so on. The method for including the synthesis sound information and the index of the compressing method as a part of the waveform data may use a method for containing the synthesis sound information and the index of the compressing method in a header of the waveform data and compressing them, a method for adding the synthesis sound information and the index of the compressing method to the compressed waveform data, or the like. The terminal-side apparatus 100D selects the compressing method having the large amount of information (the amount of data), as means of selection the optimum compressing method based on the compressing method available to the server-side apparatus 200D and the compressing method available to the terminal-side apparatus 100D. For example, when the terminal-side apparatus 100D and the server-side apparatus 200D can use the compressing method of the full rate and the half rate, the full rate having the large amount of information of data is automatically selected.

According to the fifth embodiment, inasmuch as the server-side apparatus 200D can select the recognition engine depending on the selected compressing method, the server-side apparatus 200D prepares the recognition engine suitable to the compressing method, thereby obtaining a high recognition rate to the speech data of various compressing methods.

According to the fifth embodiment, the speech recognition method comprises, in the terminal-side apparatus 100D, a step of receiving the compressing method information available to the server-side apparatus server-side apparatus 200D that is transmitted from the server-side apparatus 200D, a step of selecting the optimum compressing method from the received compressing method information, a step of forming the index of the selected compressing method, and a step of compressing the waveform data at the speech interval to transmit it with the formed compressing method index contained as a part of the compressed waveform data, and, in the server-side apparatus 200D, a step of, when receiving the compressing method request signal transmitted from the terminal-side apparatus 100D, obtaining the compressing method information stored in the compressing method storing portion 212 for storing the information on the compressing methods available to the server-side apparatus 200D to transmit the compressing method information to the terminal-side apparatus 100D, a step of obtaining the index of the compressing method from the decompressed data, a step of selecting the recognition engine from the obtained compressing method index, and a step of setting the selected engine from the stored engines.

SIXTH EMBODIMENT

Figure 6A:
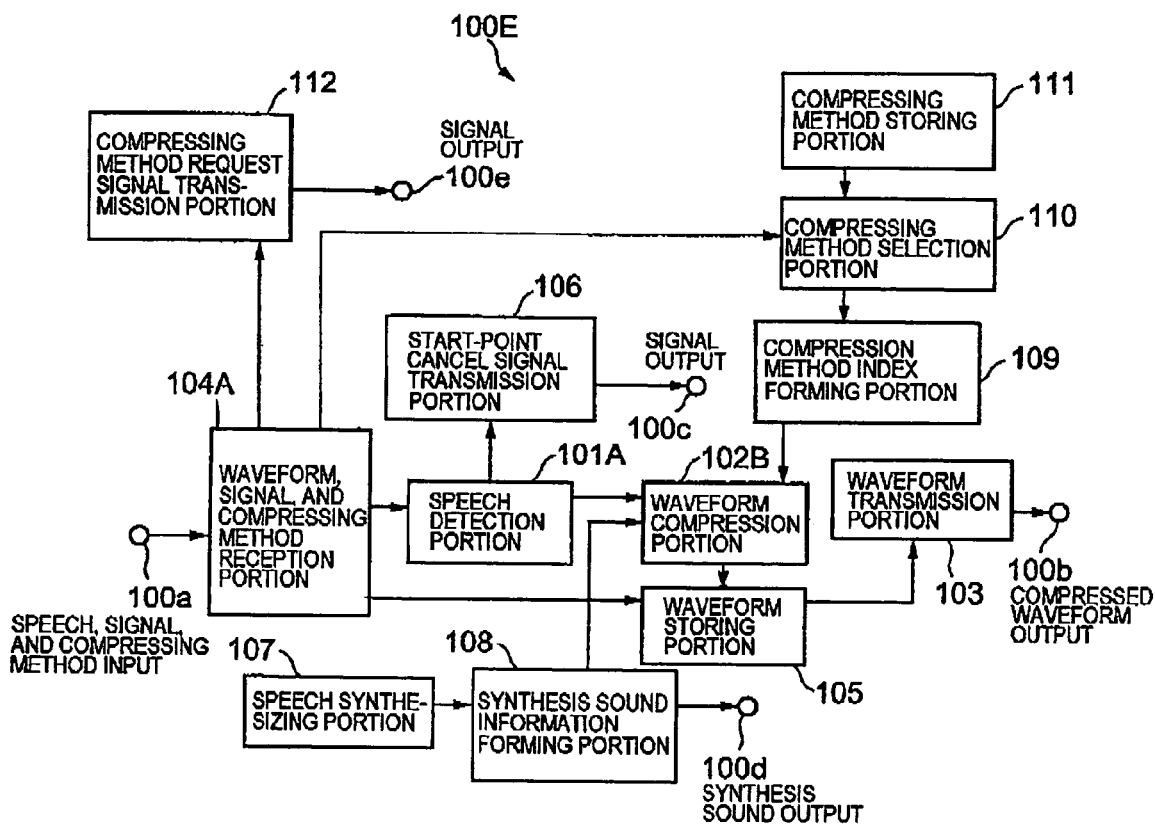
FIG. 6A is a block diagram showing a terminal side apparatus according to a sixth embodiment of the present invention.
Figure 6B:
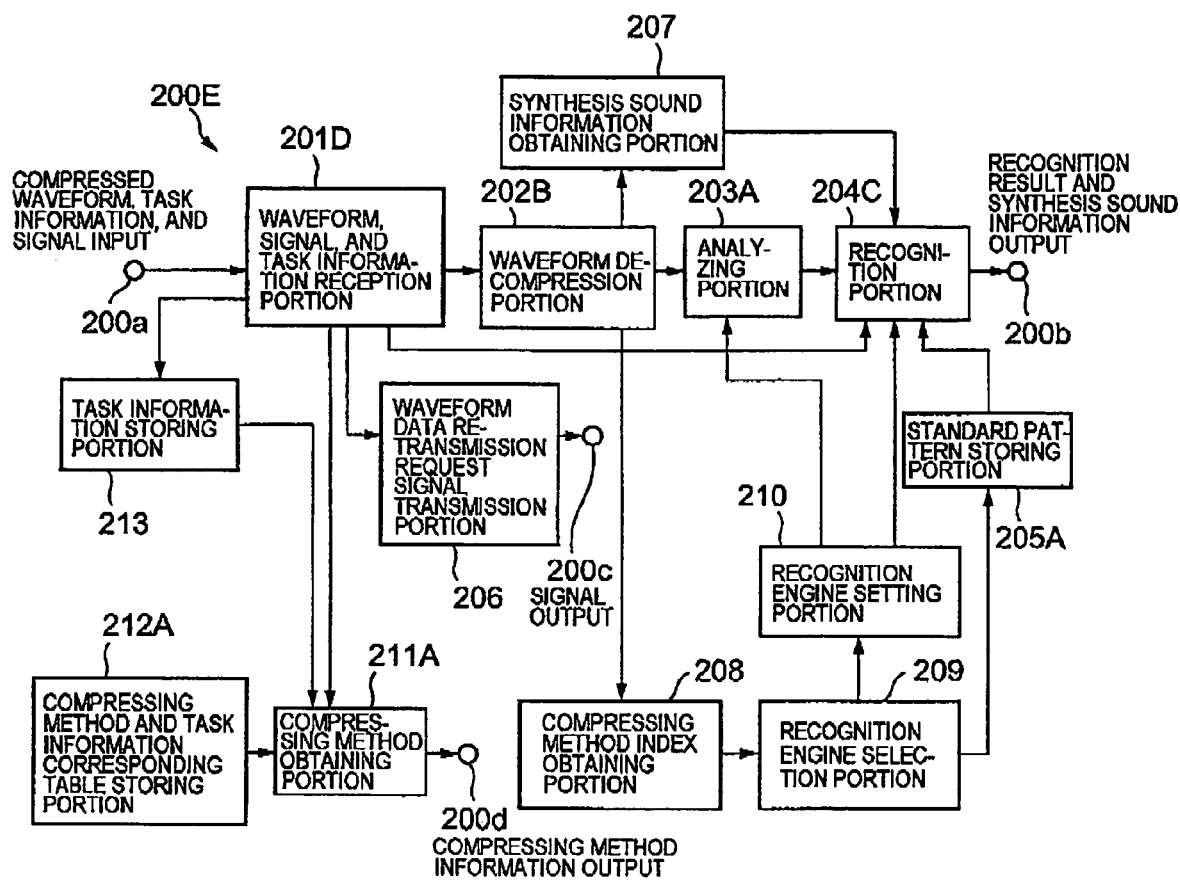
FIG. 6B is a block diagram showing a server side apparatus according to the sixth embodiment of the present invention.

Referring to FIGS. 6A and 6B, the description will proceed to a server-client type speech recognition apparatus according to a sixth embodiment of the present invention. FIG. 6A shows the structure of a terminal-side apparatus 100E. FIG. 6B shows the structure of a server-side apparatus 200E.

According to the sixth embodiment, the server-client type speech recognition apparatus has the structure according to the fifth embodiment, and further has the following frame. According to the frame, when the server-side apparatus 200E receives a compressing method request signal transmitted from the terminal-side apparatus 100E, the compressing method available to the server-side apparatus 200E is obtained and is transmitted to the terminal-side apparatus 100E based on task information inputted from a contents side and a corresponding table between task information which is previously provided for the server-side apparatus 200E and the compressing method available to the task.

Referring to FIG. 6A, the terminal-side apparatus 100E has the input terminal 100a, the compressed waveform output terminal 100b, the first signal output terminal 100c, the synthesis sound output terminal 100d, and the second signal output terminal 100e. The terminal-side apparatus 100E comprises the waveform, signal, and the compressing method reception portion 104A, the speech detection portion 101A, the waveform compression portion 102B, the waveform transmission portion 103, the waveform storing portion 105, the start-point cancel signal transmission portion 106, the speech synthesizing portion 107, the synthesis sound information forming portion 108, the compressing method index forming portion 109, the compressing method selection portion 110, the compressing method storing portion 111, and the compressing method request signal transmission portion 112.

In the terminal-side apparatus 100E, the waveform, signal, and compressing method reception portion 104A is supplied with the speech data, the compressing method request signal, the waveform data re-transmission request signal transmitted from the server-side apparatus 200E, or the compressing method information transmitted from the server-side apparatus 200E.

It is assumed that the waveform, signal, and compressing method reception portion 104A is supplied with the compressing method request signal. In this event, the received compressing method request signal is sent to the compressing method request signal transmission portion 112 from the waveform, signal, and compressing method reception portion 104A. The compressing method request signal transmission portion 112 transmits, from the second signal output terminal 100e to the server-side apparatus 200E, the compressing method request signal sent from the waveform, signal, and compressing method reception portion 104A.

It is assumed that the waveform, signal, and compressing method reception portion 104E is supplied with the compressing method information available to the server-side apparatus 200E which is transmitted from the server-side apparatus 200E. In this event, the received compressing method information is sent to the compressing method selection portion 110 from the waveform, signal, and compressing method reception portion 104A.

According to the sixth embodiment, similarly to the fourth embodiment, the terminal-side apparatus 100E comprises the compressing method storing portion 111 for storing the compressing methods available to the terminal-side apparatus 100E and the compressing method selection portion 110 for selecting the compressing method of the waveform.

The compressing method stored in the compressing method storing portion 111 includes a waveform compressing method (full rate, half rate, and the like), information of wavebands (4 kHz, 8 kHz, and the like), and so on. The compressing method selection portion 110 selects the compressing method having the large amount of information data based on the compressing method information available to the server-side apparatus 200E stored in the compressing method storing portion 111 and the compressing method available to the terminal-side apparatus 100E sent from the waveform, signal, and compressing method reception portion 104A. For example, when the terminal-side apparatus 100E and the server-side apparatus 200E can have the compressing methods of the full rate and the half rate, the full rate having the large amount of information of data is selected. The method name selected by the compressing method selection portion 110 is sent to the compressing method index forming portion 109. The compressing method index forming portion 109 forms the index of the method name selected by the compressing method selection portion 110. The index formed by the compressing method index forming portion 109 is sent to the waveform compression portion 102B.

It is assumed that the waveform, signal, and compressing method reception portion 104A is supplied with the speech data. In this event, the received speech data is sent to the speech detection portion 101A from the waveform, signal, and compressing method reception portion 104A. The speech detection portion 101A detects the speech of the received waveform data sent from the waveform, signal, and compressing method reception portion 104A. The detection method uses the word spotting method or the like. The speech data detected by the speech detection portion 101A is sent to the waveform compression portion 102B.

It is assumed that the detection of the speech is canceled in the speech detection portion 101A after detecting the speech. In this event, the signal at the timing of canceling the start point (the start-point cancel signal) is sent from the speech detection portion 101A to the start-point cancel signal transmission portion 106. The start-point cancel signal transmission portion 106 transmits, to the server-side apparatus 200E from the first signal output terminal 100c, the sent signal at the timing of canceling the start point (the start-point cancel signal).

According to the sixth embodiment, similarly to the fourth and fifth embodiments, the terminal-side apparatus 100E comprises the speech synthesizing portion 107 for synthesizing the synthesis sound. The synthesis sound synthesized by the speech synthesizing portion 107 is sent to the synthesis sound information forming portion 108.

The synthesis sound information forming portion the synthesis sound information, sends the formed synthesis sound information to the waveform compression portion 102B, and produces the synthesis sound sent from the speech synthesizing portion 107 the synthesis sound output terminal 100d. The synthesis sound information uses the contents of the synthesis sound, the time stamp information upon outputting the synthesis sound, or the like.

The waveform compression portion 102B compresses the waveform data sent from the speech detection portion 101A, and contains the synthesis sound information formed by the synthesis sound information forming portion 108 and the index of the compressing method formed by the compressing method index forming portion 109 in a part of the waveform data. The method for containing the synthesis sound information and the index of the compressing method in a part of the waveform data uses (1) a method for compressing the synthesis sound information and the index of the compressing method in a header of the waveform data and compressing it, (2) a method for adding the synthesis sound information and the index of the compressing method to the compressed waveform data, and the like.

The compressing method uses the VSELP method, the PSI-CELP method, or the like. The compressed waveform data is sent from the waveform compression portion 102B to the waveform storing portion 105. The waveform storing portion 105 sends, to the waveform transmission portion 103, the compressed waveform data sent from the waveform compressing portion 102B, and stores the same data therein. The waveform transmission portion 103 transmits, to the server-side apparatus 200E from the compressed waveform output terminal 100b, the compressed waveform data sent from the waveform compression portion 102B via the waveform storing portion 105.

It is assumed that the waveform, signal, and compressing method reception portion 104A is supplied with the waveform data re-transmission request signal transmitted from the server-side apparatus 200E. In this event, the received waveform data re-transmission request signal is sent to the waveform storing portion 105 from the waveform, signal, and compressing method reception portion 104A. Responsive to the received waveform data re-transmission request signal, the waveform storing block 105 sends, to the waveform transmission portion 103, the compressed waveform data which is stored therein. The waveform transmission portion 103 transmits, to the server-side apparatus 200E from the compressed waveform output terminal 100b, the compressed waveform data sent from the waveform storing block 105.

Referring to FIG. 6B, the server-side apparatus 200E has the input terminal 200a, the recognition result and synthesis sound information output terminal 200b, the signal output terminal 200c, and the compressing method information output terminal 100d. The server-side apparatus 200E comprises a waveform, signal, and task information reception portion 201D, a waveform decompression portion 202B, the waveform data re-transmission request signal transmission portion 206, the analyzing portion 203A, the recognizing portion 204C, the standard pattern storing portion 205A, the synthesis sound information obtaining portion 207, the compressing method index obtaining portion 208, the recognition engine selection portion 209, the recognition engine storing portion 210, a compressing method obtaining portion 211A, a compressing method and task information corresponding table storing portion 212A, and a task information storing portion 213.

In the server-side apparatus 200E, the waveform, signal, and task information reception portion 201D receives the compressed waveform data transmitted from the waveform transmission portion 103 in the server-side apparatus 100E, the signal at the timing of canceling the start point (the start-point cancel signal) transmitted from the start-point cancel signal transmission portion 106, the waveform compressing method request signal transmitted from the compressing method request signal transmission portion 112, or the task information inputted from the contents side. That is, in place of the waveform and signal reception portion (201D in FIG. 5) according to the above-mentioned fifth embodiment, the waveform, signal, and task information reception portion 201D receives the waveform data, the start-point cancel signal, the compressing method request signal which are transmitted from the terminal-side apparatus 100E, and the task information transmitted from the contents side.

It is assumed that the waveform, signal, and task information reception portion 201D is supplied with the task information from the contents side. In this event, the waveform, signal, and task information reception portion 201D sends the task information to the task information storing portion 213. The task information storing portion 213 stores the task information sent from the waveform, signal, and task information reception portion 201D, and sends the same information to the compressing method obtaining portion 211A. At any rate, the task information storing portion 213 stores the task information received by the waveform, signal, and task information reception portion 201D.

It is assumed that the waveform compressing method request signal is received in the waveform, signal, and task information reception portion 201D. In this event, the waveform, signal, and task information reception portion 201D sends the received waveform compressing method request signal to the compressing method obtaining portion 211A. When the received waveform compressing method request signal is sent from the waveform, signal, task information reception portion 201D, the compressing method obtaining portion 211A obtains an available compressing method from a corresponding table between the task information stored in the compressing method and task information corresponding table storing portion 212A and the compressing method available to the task and the task information sent from the task information storing portion 213 to transmit the obtained compressing method information to the terminal-side apparatus 100E from the compressing method information output terminal 200d.

That is, the compressing method and task information corresponding table storing portion 212A stores the task information and one or more compressing methods available upon using the task. When the waveform, signal, and task information reception portion 201D receives the compressing method request signal, the compressing method obtaining portion 211A obtains the available compressing method information from the task information sent from the task information storing portion 213 and the corresponding table between the task information and the compressing method sent from the compressing method and task information corresponding table storing portion 212A to transmit the obtained compressing method information to the terminal-side apparatus 100E.

The compressing method described in the corresponding table 212A between the task information of the server-side apparatus 200E and the compressing method available to the task includes information of wavebands (4 kHz, 8 kHz, and the like), information of a compressing method (full rate, half rate, and the like), and so on.

When the waveform data is received in the waveform, signal, and task information reception portion 201D, the waveform, signal, and task information portion 201D sends the received waveform data to the waveform decompression portion 202B. If the reception of the waveform data fails in the waveform, signal, and task information reception portion 201D, the waveform, signal, and task information reception portion 201D sends the waveform data re-transmission request signal to the waveform data re-transmission request signal transmission portion 206. The waveform data re-transmission request signal transmission portion 206 transmits, from the signal output terminal 200c to the terminal-side apparatus 100E, the waveform data re-transmission request signal sent from the waveform, signal, and task information reception portion 201D.

The waveform decompression portion 202B separates the data sent from the waveform, signal, and task information reception portion 201D into the waveform data and another data, and decompresses the waveform data.

The other information is sent to the synthesis sound information obtaining portion 207 and the compressing method index obtaining portion 208. The decompressed data is send to the analyzing portion 203A. The synthesis sound information obtaining 207 obtains the synthesis sound information from the information sent from the waveform decompression portion 202B. The obtained synthesis sound information is sent to the recognizing portion 204C from the synthesis sound information obtaining portion 207.

The compressing method index obtaining portion 208 obtains the index of the compressing method from the information sent from the waveform decompression portion 202B. The obtained index is sent to the recognition engine selection portion 209 from the compressing method index obtaining portion 208.

The recognition engine selection portion 209 selects the recognition engine used for recognition based on the index obtained by the compressing method index obtaining portion 208. The information on the engine selected by the recognition engine selection portion 209 is sent to the recognition engine setting portion 210 and the standard pattern storing portion 205A.

The recognition engine setting portion 210 sends, to the analyzing portion 203A, the analysis method of the used engine based on the engine information sent from the recognition engine selection portion 209 and sends the recognition method to the recognizing portion 204C. The standard pattern storing portion 205A sets the used standard pattern from the engine information sent from the recognition engine selection portion 209. The analyzing portion 203A converts, into the characteristic vector, the waveform data decompressed by the waveform decompression portion 202B. The characteristic vector uses the cepstrum vector, $\Delta$cepstrum vector, or the like.

The characteristic vector analyzed by the analyzing portion 203A is sent to the recognizing portion 204C. The recognizing portion 204C calculates the likelihood between the characteristic vector sent from the analyzing portion 203A and standard patterns sent from the standard pattern storing portion 205A so as to obtain a recognition result. The method for calculating the likelihood uses the Viterbi algorithm, DP matching, or the like. The recognition result calculated by the recognizing portion 204C and the synthesis sound information obtained by the synthesis sound information obtaining portion 207 are transmitted to the terminal-side apparatus 100E from the recognition result and synthesis sound information output terminal 200b. Alternatively, the both are associated with each other, thus the corresponding relationship is established between the recognition result and the synthesis sound, and the associated recognition result is transmitted to the terminal-side apparatus 100E from the recognizing portion 204C.

It is assumed that the waveform, signal, and task information reception portion 201D is supplied with the signal at the timing of canceling the start point (the start-point cancel signal) transmitted from the start-point cancel signal transmission portion 106. In this event, the received signal at the timing of canceling the start point (the start-point cancel signal) is sent to the recognizing portion 204C from the waveform, signal, and task information reception portion 201D. When the received signal at the timing of canceling the start point (the start-point cancel signal) is sent from the waveform, signal, and task information reception portion 201D, the recognizing portion 204C stops the recognition in the halfway.

At any rate, a combination of the analyzing portion 203A, the recognizing portion 204C, and the standard pattern storing portion 205A serves as recognizing means which performs the recognition processing by using the waveform data decompressed by the waveform decompression portion 202B to produce the recognition result, and stops the recognition processing in response to the start-point cancel signal received by the waveform, signal, and task information portion 201D. Further, when the recognition ends, the recognizing means associates the synthesis sound with the recognition result from the synthesis sound information obtained from the synthesis sound information obtaining portion 207 to produce the associated recognition result or the recognition result and the synthesis sound information.

According to the sixth embodiment, in addition to the information on the compressing method which is commonly available in the server-side apparatus 200E and the terminal-side apparatus 100E upon selecting the compressing method, the task information is added. Thus, it is possible to select the compressing method which is commonly available in the server-side apparatus 200E and the terminal-side apparatus 100E and which is suitable to the input task. For example, preferably, the response time is short for the task for communication between the terminal-side apparatus 100E and the server-side apparatus 200E. Consequently, the compressing method with the short time for transferring the data is described in the corresponding table between the task information and the compressing method. In the task which relatively does not need the response time to search for the key word which is inputted by speech using the terminal-side apparatus 100E, by the server-side apparatus 200E, the compressing method having the large amount of information of data is described in the corresponding table. Consequently, it is possible to select the compressing method suitable to the task.

According to the sixth embodiment, the speech recognition method comprises, in the server-side apparatus 200E, a step of receiving the task information transmitted from the contents side to store it to the task information storing portion 213, and a step of, when receiving the compressing method request signal, obtaining the available compressing method information from the corresponding table 212A between the task information and the compressing method to transmit it to the terminal-side apparatus 100E.

SEVENTH EMBODIMENT

Figure 7A:
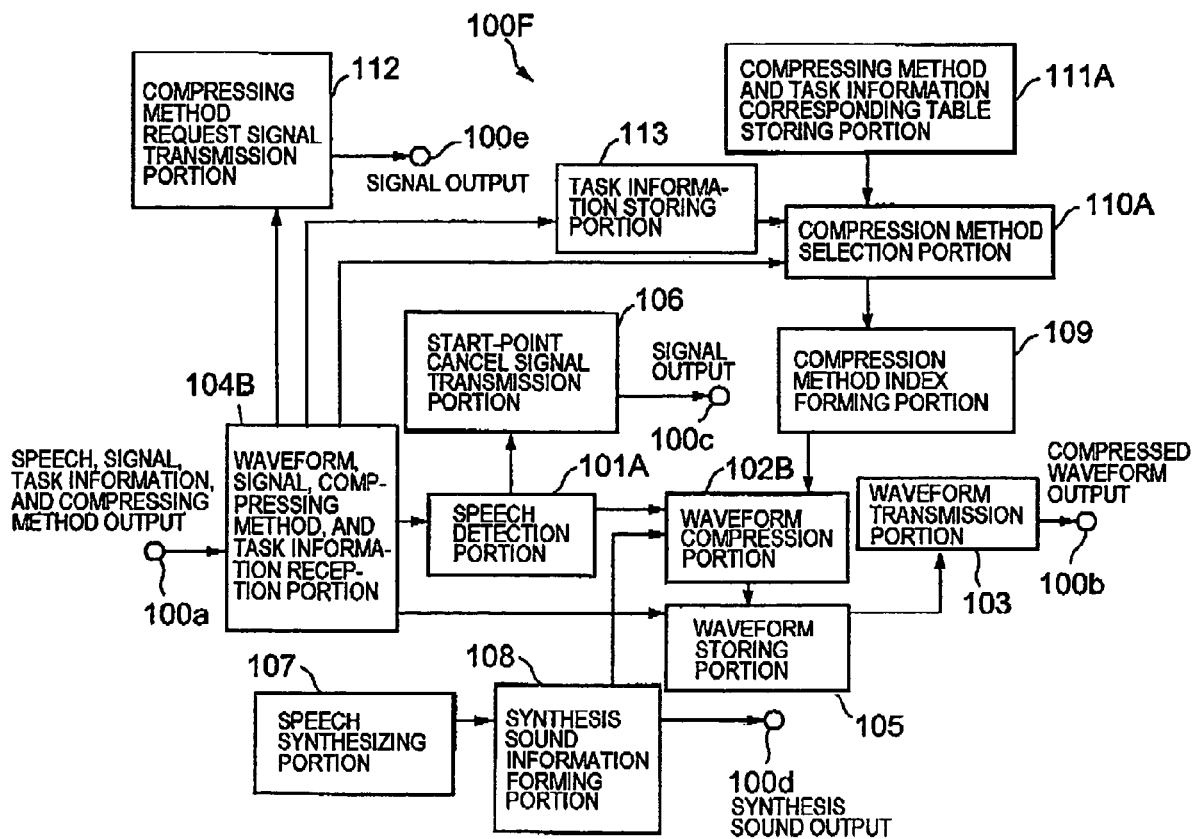
FIG. 7A is a block diagram showing a terminal side apparatus according to a seventh embodiment of the present invention.
Figure 7B:
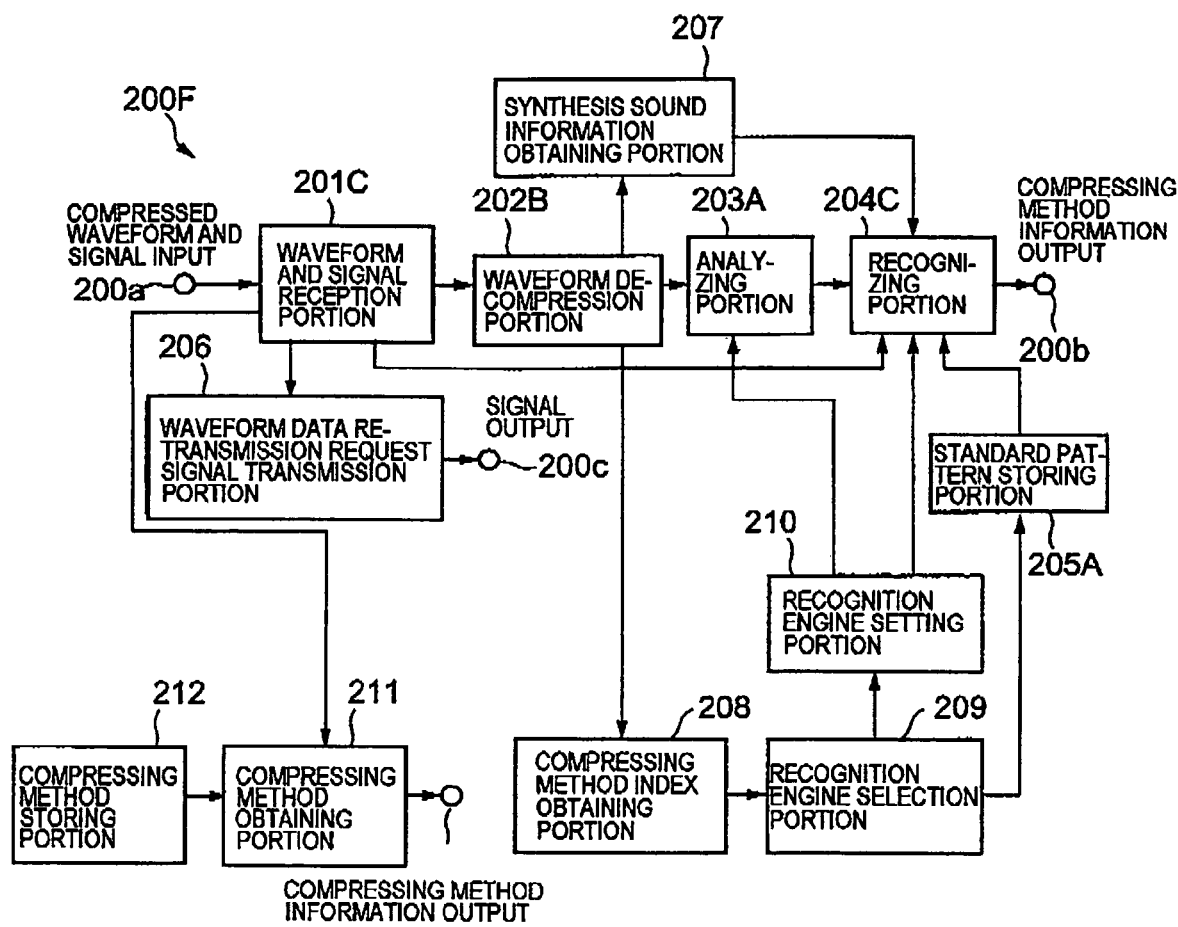
FIG. 7B is a block diagram showing a server side apparatus according to the seventh embodiment of the present invention.

Referring to FIGS. 7A and 7B, the description will proceed to a server-client type speech recognition apparatus according to a seventh embodiment of the present invention. FIG. 7A shows the structure of a terminal-side apparatus 100E. FIG. 7B shows the structure of a server-side apparatus 200F.

According to the seventh embodiment, a server-client type speech recognition apparatus has the structure according to the fifth embodiment, and further has the following frame. According to the frame, when the server-side apparatus 200F transmits the compressing method information available to the server-side apparatus 200F, the terminal-side apparatus 100F selects an optimum compressing method based on the compressing method information available to the server-side apparatus 200E, the task information inputted from the contents side, and a corresponding table between the task information which is previously provided for the server-side apparatus 200F and the compressing method available to the task.

Referring to FIG. 7A, the terminal-side apparatus 100F has the input terminal 100a, the compressed waveform output terminal 100b, the first signal output terminal 100c, the synthesis sound output terminal 100d, and the second signal output terminal 100e. The terminal-side apparatus 100F comprises a waveform, signal, compressing method, and task information reception portion 104B, the speech detection portion 101A, the waveform compression portion 102B, the waveform transmission portion 103, the waveform storing portion 105, the start-point cancel signal transmission portion 106, the speech synthesizing portion 107, the synthesis sound information forming portion 108, the compressing method index forming portion 109, a compressing method selection portion 110A, a compressing method and task information corresponding table storing portion 111A, the compressing method request signal transmission portion 112, and a task information storing portion 113.

In the terminal-side apparatus 100E, the waveform, signal, compressing method, and task information reception portion 104B is supplied with the speech data, the compressing method request signal, the waveform data re-transmission request signal transmitted from the server-side apparatus 200F, the compressing method information transmitted from the server-side apparatus 200F, or the task information transmitted from the contents side. That is, in place of the waveform, signal, and compressing method reception portion (104A in FIG. 5) according to the fifth embodiment, the waveform, signal, compressing method, and task information reception portion 104B receives the inputted waveform data, the task information transmitted from the contents side, the waveform data re-transmission request signal transmitted from the server-side apparatus 200F, and the compressing method information available to the server-side apparatus 200F that is transmitted from the server-side apparatus 200F.

It is assumed that the waveform, signal, compressing method, and task information reception portion 104B is supplied with the task information. In this event, the received task information is sent to the task information storing portion 113 from the waveform, signal, compressing method, and task information reception portion 104B. The task information storing portion 113 sends, to the compressing method selection portion 110A, the task information send from the waveform, signal, compressing method, and task information reception portion 104B, and stores it therein. At any rate, the task information storing portion 113 stores the task information received by the waveform, signal, compressing method, and task information reception portion 104B.

It is assumed that the waveform, signal, compressing method, and task information reception portion 104B is supplied with the compressing method request signal. In this event, the received compressing method request signal is sent to the compressing method request signal transmission portion 112 from the waveform, signal, compressing method, and task information reception portion 104B. The compressing method request signal transmission portion 112 transmits, from the second output terminal 100e to the server-side apparatus 200F, the received compressing method request signal sent from the waveform, signal, compressing method, and task information reception portion 104B.

It is assumed that the waveform, signal, compressing method, and task information reception portion 104B is supplied with the compressing method information available to the server-side apparatus 200F that is transmitted from the server-side apparatus 200F. In this event, the received compressing method information is sent from the waveform, signal, compressing method, and task information reception portion 104B to the compressing method selection portion 110A.

According to the seventh embodiment, the terminal-side apparatus 100F includes the compressing method and task information corresponding table storing portion 111A for storing the corresponding table between the task information and the compressing method available to the task. The compressing method stored in the compressing method and task information corresponding table storing portion 11A includes information of the waveform compressing method (full rate, half rate, and the like) and wavebands (4 kHz, 8 kHz, and the like). At any rate, the compressing method and task information corresponding table storing portion 111A stores the corresponding table between the task information and one or more compressing methods available to the task use. The compressing method described in the corresponding table between the task information and the compressing method available to the task includes the waveband information (4 kHz, 8 kHz, and the like), and information of compressing method (full rate, half rate, and the like) or the like.

The compressing method selection portion 110A selects the compressing method having the large amount of information of data additionally having the task information based on the task information sent from the task information storing portion 113, the compressing method information available to the server-side apparatus 200F sent from the waveform, signal, compressing method, and task information reception portion 104B, and the information on the corresponding table stored in the compressing method and task information corresponding table storing portion 111A. At any rate, when the waveform, signal, compressing method, and task information storing portion 104B receives the compressing method information available to the server-side apparatus 200F, the compressing method selection portion 110A selects the optimum compressing method based on the task information sent from the task information storing portion 113, the corresponding table between the task information and the compressing method sent from the compressing method and task information table storing portion 111A, and the compressing method information available to the server-side apparatus 200F which is sent from the waveform, signal, compressing method, and task information reception portion 104B. The method name selected by the compressing method selection portion 110A is sent to the compressing method index forming portion 109.

The compressing method index forming portion 109 forms the index of the method name selected by the compressing method selection portion 110A. The index formed by the compressing method index forming portion 109 is sent to the waveform compression portion 102B.

It is assumed that the waveform, signal, compressing method, and task information selection portion 104B is supplied with the speech data. In this event, the received speech data is sent to the speech detection portion 101A from the waveform, signal, compressing method, and task information reception portion 104B. The speech detection portion 101A detects the speech of the waveform data sent from the waveform, signal, compressing method, and task information reception portion 104B. The detection method uses the word spotting method or the like. The speech data detected by the speech detection portion 101A is sent to the waveform compression portion 102B.

It is assumed that the detection of the speech is canceled in the speech detection portion 101A after detecting the speech. In this event, the signal at the timing of canceling the start point (the start-point cancel signal) is sent from the speech detection portion 101A to the start-point cancel signal transmission portion 106. The start-point cancel signal transmission portion 106 transmits, to the server-side apparatus 200F from the first signal output terminal 100c, the signal at the timing of canceling the start point (the start-point cancel signal) sent from the speech detection portion 101A.

According to the seventh embodiment, similarly to the fourth to sixth embodiments, the terminal-side apparatus 100F includes the speech synthesizing portion 107 for synthesizing the synthesis sound. The synthesis sound formed by the speech synthesizing portion 107 is sent to the synthesis sound information forming portion 108. The synthesis sound information forming portion 108 forms the synthesis sound information, sends the formed synthesis sound information to the waveform compression portion 102B, and produce the synthesis sound sent from the speech synthesizing portion 107 from the synthesis sound output terminal 100d. The synthesis sound information uses the contents of the synthesis sound, the time stamp information upon outputting the synthesis sound, or the like.

The waveform compression portion 102B compresses the waveform data sent from the speech detection portion 101A, and contains the synthesis sound information formed by the synthesis sound information forming portion 108 and the index of the compressing method formed by the compressing method index forming portion 109 in a part of the waveform data.

The method for containing the synthesis sound information and the index of the compressing method in a part of the waveform data uses (1) a method for compressing the synthesis sound information and the index of the compressing method in a header of the waveform data and compressing it, (2) a method adding the synthesis sound information and the index of the compressing method to the compressed waveform data, and the like. The compressing method uses the VSELP method, the PSI-CELP method, or the like.

The waveform data compressed by the waveform compression portion 102B is sent to the waveform storing portion 105. The waveform storing portion 105 sends, to the waveform transmission portion 103, the compressed waveform data sent from the waveform compression portion 102B, and stores the same data therein. The waveform transmission portion 103 transmits, to the server-side apparatus 200F from the compressed waveform output terminal 100b, the compressed waveform data sent from the waveform compression portion 102B via the waveform storing portion 105.

It is assumed that the waveform, signal, compressing method, and task information reception portion 104B is supplied with the waveform data re-transmission request signal transmitted from the server-side apparatus 200F. In this event, the received waveform data re-transmission request signal is to the waveform storing portion 105 from the waveform, signal, compressing method, and task information reception portion 104B. Responsive to the received waveform data re-transmission request signal, the waveform storing portion 103 sends, to the waveform transmission portion 103, the compressed waveform data which is stored therein. The waveform transmission portion 1040 transmits, to the server-side apparatus 200F from the compressed waveform output terminal 100b, the compressed waveform data sent from the waveform storing portion 105.

Referring to FIG. 7B, the server-side apparatus 200F has the input terminal 200a, the recognition result and synthesis sound information output terminal 200b, the signal output terminal 200c, and a compressing method information output terminal 200d. The server-side apparatus 200F comprises a waveform and signal reception portion 201C, the waveform decompression portion 202B, the waveform data re-transmission request signal transmission portion 206, the analyzing portion 203A, the recognizing portion 204C, the standard pattern storing portion 205A, the synthesis sound information obtaining portion 207, the compressing method index obtaining portion 208, the recognition engine selection portion 209, the recognition engine setting portion 210, the compressing method obtaining portion 211, and the compressing method storing portion 212.

In the server-side apparatus 200F, the waveform and signal reception portion 201C receives the compressed waveform data transmitted from the waveform transmission portion 103 in the terminal-side apparatus 100F, the signal at the timing of canceling the start point (the start-point cancel signal) transmitted from the start-point cancel signal transmission portion 106, or the waveform compressing method request signal transmitted from the compressing method request signal transmission portion 112.

When the waveform compressing method request signal is received, the waveform and signal reception portion 201C sends the received waveform compressing method request signal to the compressing method obtaining portion 211. When the waveform compressing method request signal is sent from the waveform and signal reception portion 201C, the compressing method obtaining portion 211 obtains the compressing method available to the server-side apparatus 200F from the compressing methods stored in the compressing method storing portion 212, and transmits the obtained compressing method information from the compressing method information output terminal 200d to the terminal-side apparatus 100F.

When the waveform data is received in the waveform and signal reception portion 201C, the received waveform data is sent to the waveform decompression portion 202B from the waveform and signal reception portion 201.

It is assumed that reception of the waveform data fails in the waveform and signal reception portion 201C. In this event, the waveform and signal reception portion 201C sends the waveform data re-transmission request signal to the waveform data re-transmission request signal transmission portion 206. The waveform data re-transmission request signal transmission portion 206 transmits, to the terminal-side apparatus 100F from the signal output terminal 200c, the waveform data re-transmission request signal sent from the waveform and signal reception portion 201C.

The waveform decompression portion 202B separates the data sent from the waveform and signal reception portion 201C into the waveform data and another data, and decompresses the waveform data. The other information is sent to the synthesis sound information obtaining portion 207 and the compressing method index obtaining portion 208, and the decompressed waveform data is sent to the analyzing portion 203A.

The synthesis sound information obtaining portion 207 obtains the synthesis sound information based on the information sent from the waveform decompression portion 202B. The synthesis sound information obtained by the synthesis sound information obtaining portion 207 is sent to the recognizing portion 204C.

The compressing method index obtaining portion 208 obtains the index of the compressing method from the information sent from the waveform decompression portion 202B. The index obtained by the compressing method index obtaining portion 208 is sent to the recognition engine selection portion 209. The recognition engine selection portion 209 selects the recognition engine used for the recognition based on the index obtained by the compressing method index obtaining portion 208. The information for the engine selected by the recognition engine selection portion 209 is sent to the recognition engine setting portion 210 and the standard pattern storing portion 205A.

The recognition engine setting portion 210 sends, to the analyzing portion 203A, the analysis method of the used engine based on the engine information sent from the recognition engine selection portion 209 and sends the recognition method to the recognition portion 204C. The standard pattern storing portion 205A sets the used standard pattern from the engine information sent from the recognition engine selection portion 209.

The analyzing portion 203A converts, into the characteristic vector, the waveform data decompressed by the waveform decompression portion 202B. The characteristic vector uses the cepstrum vector, Δcepstrum vector, or the like. The characteristic vector analyzed by the analyzing portion 203A is sent to the recognizing portion 204C. The recognizing portion 204C calculates the likelihood between the characteristic vector sent from the analyzing portion 203A and standard patterns sent from the standard pattern storing portion 205A so as to obtain a recognition result. The method for calculating the likelihood uses the Viterbi algorithm, DP matching, or the like. The calculated recognition result and the synthesis sound information obtained by the synthesis sound information obtaining portion 207 are transmitted to the terminal-side apparatus 100F from the recognition result and synthesis sound information output terminal 200b. Alternatively, the both are associated with each other, thus the corresponding relationship is established between the recognition result and the synthesis sound, and the associated recognition result is transmitted to the terminal-side apparatus 100F from the recognition result and synthesis sound information output terminal 200b.

It is assumed that the waveform and signal reception portion 201C is supplied with the signal at the timing of canceling the start point (the start-point cancel signal) transmitted from the start-point cancel signal transmission portion 106. In this event, the received signal at the timing of canceling the start point (the start-point cancel signal) is sent to the recognizing portion 204C from the waveform and signal reception portion 201C. When the received signal at the timing of canceling the start point (the start-point cancel signal) is sent from the waveform and signal reception portion 201C, the recognizing portion 204C stops the recognition in the half-way.

At any rate, a combination of the analyzing portion 203A, the recognizing portion 204C, and the standard pattern storing portion 205A serves as recognizing means which performs the recognition processing by using the waveform data decompressed by the waveform decompression portion 202B to produce the recognition result. Further, when the recognition ends, the recognizing means associates the synthesis sound with the recognition result from the synthesis sound information obtained from the synthesis sound information obtaining portion 207 to produce the associated recognition result or the recognition result and the synthesis sound information.

According to the seventh embodiment, similarly to the sixth embodiment, in addition to the compressing method information which is commonly available to the server-side apparatus 200F and the terminal-side apparatus 100F upon selecting the compressing method, the task information is added. Thus, it is possible to select the compressing method which is commonly available in the server-side apparatus 200F and the terminal-side apparatus 100F and which is suitable to the inputted task.

According to the seventh embodiment, the speech recognition method comprises, in the terminal-side apparatus 100F, a step of receiving the task information transmitted from the contents side and the compressing method information available to the server-side apparatus 200F that is transmitted from the server-side apparatus 200F, and a step of, when receiving the compressing method information available to the server-side apparatus 200F, selecting an optimum compressing method based on the task information, the corresponding table between the task information and the compressing method sent from the compressing method and task information corresponding table storing portion 111A, and the compressing method information available to the server-side apparatus 200F.

As mentioned above, according to the present invention, advantageously, it is possible to confirm the mutual specification of the speech processing and capacity between the client and the server and to set the best specification of the speech processing such as the compression and decompression of speech suitable to the scale and the difficulty level of task as the recognition target.

Further, according to the present invention, advantageously, it is possible to perform the recognition processing of large-scaled task for the recognition processing of the server and to promptly respond to the updating of the recognition engine and the like.

According to the above-mentioned embodiments, the terminal-side apparatus is, for example, preferably a mobile terminal. However, the terminal-side apparatus is not limited to the mobile terminal and may include arbitrary information terminals which can be connected to the server-side apparatus of the server-client type speech recognition apparatus and which can input the speech.

Although the present invention have been described based on the above-mentioned respective embodiments, the present invention is not limited to structure of the above-mentioned embodiments and may include a combination of respective embodiments, and the present invention can variously be modified or applied in the those skilled in the art without departing the range of the essentials of the present invention.

The invention claimed is:

1. A speech recognition apparatus comprising a terminal-side apparatus (100B, 100C) and a server-side apparatus (200B, 200C), wherein said terminal-side apparatus (100B, 100C) comprises:
a waveform and signal reception portion (104) for receiving waveform data of a received speech to produce received waveform data and for receiving a waveform data re-transmission request signal transmitted from said server-side apparatus to produce received waveform data re-transmission request signal;
a speech detection portion (101A) for detecting a speech interval of the received waveform data to produce waveform data at the detected speech interval and for producing a start-point cancel signal when and the speech is detected and thereafter the detection is canceled;
a waveform compression portion (102, 102A) for compressing the waveform data at the detected speech interval to produce compressed waveform data;
a waveform storing portion (105) for temporarily storing the compressed waveform data as the stored waveform data to simultaneously produce the stored waveform data and for producing the stored waveform data in response to the received waveform data re-transmission request signal;
a waveform transmission portion (103) for transmitting the stored waveform data to said server-side apparatus;
a start-point cancel signal transmission portion (106) for transmitting the start-point cancel signal outputted from said speech detection portion to said server-side apparatus, and
wherein said server-side apparatus (200B, 200C) comprises:
a waveform and signal reception portion (201B) for receiving compressed waveform data and the start-point cancel signal from said terminal-side apparatus to produce received waveform data and received start-point cancel signal and for producing a waveform data re-transmission request signal when the reception of the compressed waveform data fails;
a waveform decompression portion (202, 202A) for decompressing the received waveform data to produce decompressed waveform data;
recognizing means (203, 204A, 204B, 205) for performing recognition processing by using the decompressed waveform data to produce a recognition result and for stopping the recognition processing in response to the received start-point cancel signal; and
a waveform data re-transmission request signal transmission portion (206) for transmitting, to said server-side apparatus, the waveform data re-transmission request signal from said waveform and signal reception portion.

2. A speech recognition apparatus as claimed in claim 1, wherein said terminal-side apparatus (100C) further comprises:
a speech synthesizing portion (107) for synthesizing synthesis sound to produce synthesized synthesis sound; and
a synthesis sound information forming portion (108) for forming information on the synthesized synthesis sound to produce formed synthesis sound information and for producing the synthesis sound,
wherein said waveform compression portion (102A) sends the formed synthesis sound information with it contained in a part of the compressed waveform data,
wherein said server-side apparatus (200C) further comprises:
a synthesis sound information obtaining portion (207) for obtaining the synthesis sound information from the waveform data decompressed by said waveform decompression portion to produce obtained synthesis sound information, and
wherein said recognizing means (204B) associates the obtained synthesis sound information with the recognition result upon ending the recognition to produce associated recognition result or the recognition result and the synthesis sound information.

3. A speech recognition apparatus comprising a terminal-side apparatus (100D) and a server-side apparatus (200D), wherein said terminal-side apparatus (100D) comprises:
a waveform, signal and compressing method reception portion (104A) for receiving at least inputted waveform data, a waveform data re-transmission request signal transmitted from said server-side apparatus, and compressing method information available to said server-side apparatus transmitted from said server-side apparatus to produce received waveform data, a received waveform data re-transmission request signal, and received compressing method information;
a speech detection portion (101A) for detecting a speech interval of the received waveform data to produce waveform data at the detected speech interval;
a compressing method selection portion (110) for selecting an optimum compressing method from the received compressing method information to produce a selected compressing method;
a compressing method index forming portion (109) for forming an index of the selected compressing method to produce a formed compressing method index;
a waveform compression portion (102B) for compressing the waveform data at the detected speech interval to produce compressed waveform data with the formed compressing method index contained in a part of the compressed waveform data;
a waveform storing portion (105) for temporarily storing the compressed waveform data as the stored waveform data to produce simultaneously the stored waveform data and for producing the stored waveform data in response to the received waveform data re-transmission request signal;
a waveform transmission portion (103) for transmitting the stored waveform data to said server-side apparatus; and
a compressing method request signal transmission portion (112) for transmitting a compressing method request signal to said server-side apparatus,
wherein said server-side apparatus (200D) comprises:
a waveform and signal reception portion (201C) for receiving compressed waveform data and the compressing method request signal transmitted from said terminal-side apparatus to produce received waveform data and a received compressing method request signal and for producing a waveform data re-transmission request signal when the reception of the compressed waveform data fails;
a waveform decompression portion (202B) for decompressing the received waveform data to produce decompressed waveform data;
recognizing means (203A, 204C, 205A) for performing recognition processing by using the decompressed waveform data to produce a recognition result;
a waveform data re-transmission request signal transmission portion (206) for transmitting, to said server-side apparatus, the waveform data re-transmission request signal outputted from said waveform and signal reception portion;
a compressing method storing portion (212) for storing compressing method information available to said server-side apparatus;
a compressing method obtaining portion (211) for obtaining, in response to the received compressing method request signal, the compressing method information stored in said compressing method storing portion to transmit the compressing method information to said terminal-side apparatus;
a compressing method index obtaining portion (208) for obtaining an index of the compressing method from the decompressed waveform data to produce an obtained compressing method index;
a recognition engine selection portion (210) for selecting a recognition engine from the obtained compressing method index to produce a selected engine; and
a recognition engine setting portion (210) for setting the selected engine to said recognizing means from stored engines.

4. A speech recognition apparatus as claimed in claim 3, wherein said terminal-side apparatus (100D) further comprises:
a speech synthesizing portion (107) for synthesizing synthesis sound to produce synthesized synthesis sound; and
a synthesis sound information forming portion (108) for forming information on the synthesized synthesis sound to produce formed synthesis sound information on the synthesis sound and for producing the synthesis sound, wherein said waveform compression portion (102B) sends, to said waveform storing portion, the formed synthesis sound information with it contained in a part of the compressed waveform data,
wherein said server-side apparatus (200D) further comprises:
a synthesis sound information obtaining portion (207) for obtaining the synthesis sound information from the decompressed waveform data to produce obtained synthesis sound information, and
wherein said recognizing means (204C) associates the synthesis sound with the recognition result from the obtained synthesis sound information upon ending the recognition to produce an associated recognition result or the recognition result and the synthesis sound information.

5. A speech recognition apparatus comprising a terminal-side apparatus (100E) and a server-side apparatus (200E), wherein said terminal-side apparatus (100E) comprises:
a waveform, signal and compressing method reception portion (104A) for receiving at least inputted waveform data, a waveform data re-transmission request signal transmitted from said server-side apparatus, and compressing method information available to said server-side apparatus transmitted from said server-side apparatus to produce received waveform data, a received waveform data re-transmission request signal, and received compressing method information;
a speech detection portion (101A) for detecting a speech interval of the received waveform data to produce waveform data at the detected speech interval and for producing a start-point cancel signal when the speech is detected and thereafter the detection is canceled;
a compressing method selection portion (110) for selecting an optimum compressing method from the received compressing method information to produce a selected compressing method;
a compressing method index forming portion (109) for forming an index of the selected compressing method to produce a formed compressing method index;
a waveform compression portion (102B) for compressing the waveform data at the detected speech interval to produce compressed waveform data with the formed compressing method index contained in a part of the compressed waveform data;

a waveform storing portion (105) for temporarily storing the compressed waveform data as the stored waveform data to produce simultaneously the stored waveform data and for producing the stored waveform data in response to the received waveform data re-transmission request signal;

a waveform transmission portion (103) for transmitting the stored waveform data to said server-side apparatus;

a start-point cancel signal transmission portion (106) for transmitting, to said server-side apparatus, the start-point cancel signal outputted from said speech detection portion; and a compressing method request signal transmission portion (112) for transmitting a compressing method request signal to said server-side apparatus, wherein said server-side apparatus (200E) comprises:

a waveform, signal, and task information reception portion (201D) for receiving compressed waveform data, the start-point cancel signal, the compressing method request signal from said terminal-side apparatus, and task information transmitted from a contents side to produce received waveform data, a received start-point cancel signal, a received compressing method request signal, and a received task information, and for producing a waveform data re-transmission request signal when the reception of the compressed waveform data fails;

a waveform decompression portion (202B) for decompressing the received waveform data to produce decompressed waveform data;

recognizing means (203A, 204C, 205A) for performing recognition processing by using the decompressed waveform data to produce a recognition result and for stopping the recognition processing in response to the received start-point cancel signal;

a waveform data re-transmission request signal transmission portion (206) for transmitting, to said server-side apparatus, the waveform data re-transmission request signal outputted from said waveform and signal reception portion;

a task information storing portion (213) for storing the received task information to produce stored task information;

a compressing method and task information corresponding table storing portion (212A) for storing the task information and one or more compressing methods available to the use of a task;

a compressing method obtaining portion (211A) for obtaining, in response to the received compressing method request signal, available compressing method information from the stored task information and the corresponding table between the task information and the compressing method transmitted from said compressing method and task information corresponding table storing portion to transmitting the compressing method information to said terminal-side apparatus;

a compressing method index obtaining portion (208) for obtaining an index of the compressing method from the decompressed waveform data to produce an obtained compressing method index;

a recognition engine selection portion (209) for selecting a recognition engine from the obtained compressing method index to produce a selected engine; and a recognition engine setting portion (210) for setting the selected engine to said recognizing means from stored engines.

6. A speech recognition apparatus as claimed in claim 5, wherein said terminal-side apparatus (100E) further comprises:

a speech synthesizing portion (107) for synthesizing synthesis sound to produce synthesized synthesis sound; and a synthesis sound information forming portion (108) for forming information on the synthesized synthesis sound to produce formed synthesis sound information and for producing the synthesis sound, wherein said waveform compression portion (102B) sends the formed synthesis sound information with it contained in a part of the compressed waveform data, wherein said server-side apparatus (200E) further comprises:

a synthesis sound information obtaining portion (207) for obtaining the synthesis sound information from the decompressed waveform data to produce obtained synthesis sound information, and wherein said recognizing means (204C) associates the synthesis sound with the recognition result from the obtained synthesis sound information upon ending the recognition to produce associated recognition result or the recognition result and the synthesis sound information.

7. A speech recognition apparatus comprising a terminal-side apparatus (100F) and a server-side apparatus (200F), wherein said terminal-side apparatus (100F) comprises:

a waveform, signal, compressing method, and task information reception portion (104B) for receiving inputted waveform data, task information transmitted from the contents side, a waveform data re-transmission request signal transmitted from said server-side apparatus, and compressing method information available to said server-side apparatus transmitted from said server-side apparatus to produce received waveform data, received task information, received waveform data re-transmission request signal, and received compressing method information;

a task information storing portion (113) for storing the received task information to produce stored task information;

a compressing method and task information corresponding table storing portion (111A) for storing a corresponding table between the task information and at least one or more compressing methods available to the use a task;

a compressing method selection portion (110A) for selecting, in response to the received compressing method information, an optimum compressing method based on the stored task information and the corresponding table between the task information and the compressing method transmitted from said compressing method and task information corresponding table storing portion to produce a selected compressing method;

a compressing method index forming portion (109) for forming an index of the selected compressing method to produce a formed compressing method index;

a speech detection portion (101A) for detecting a speech interval of the received waveform data to produce waveform data at the detected speech interval;

a waveform compressing portion (102B) for compressing the waveform data at the detected speech interval to produce compressed waveform data with the formed compressing method index contained in a part of the compressed waveform data;
a waveform storing portion (105) for temporarily storing t the compressed waveform data as the stored waveform data to produce the stored waveform data and for producing the stored waveform data in response to the received waveform data re-transmission request signal;
a waveform transmission portion (103) for transmitting the stored waveform data to said server-side apparatus; and
a compressing method request signal transmission portion (112) for transmitting a compressing method request signal to said server-side apparatus,
wherein said server-side apparatus (200F) comprises:
a waveform and signal reception portion (201C) for receiving compressed waveform data transmitted from said terminal-side apparatus and the compressing method request signal to produce received waveform data and a received compressing method request signal and for producing a waveform data re-transmission request signal when the reception of the compressed waveform data fails;
a waveform decompression portion (202B) for decompressing the received waveform data to produce decompressed waveform data;
recognizing means (203A, 204C, 205A) for performing recognition processing by using the decompressed waveform data to produce a recognition result;
a waveform data re-transmission request signal transmission portion (206) for transmitting, to said server-side apparatus, the waveform data re-transmission request signal outputted from said waveform and signal reception portion;
a compressing method storing portion (212) for storing information on the compressing methods available to said server-side apparatus;
a compressing method obtaining portion (211) for obtaining, in response to the received compressing method request signal, the compressing method information stored in said compressing method storing portion to transmit the compressing method information to said terminal-side apparatus;
a compressing method index obtaining portion (208) for obtaining an index of the compressing method from the decompressed waveform data to produce obtained compressing method index;
a recognition engine selection portion (210) for selecting a recognition engine from the obtained compressing method index to produce a selected engine; and
a recognition engine setting portion (210) for setting the selected engine to said recognizing means from stored engines.

8. A speech recognition apparatus as claimed in claim 7, wherein said terminal-side apparatus (100F) further comprises:
a speech synthesizing portion (107) for synthesizing synthesis sound to produce synthesized synthesis sound; and
a synthesis sound information forming portion (108) for forming information on the synthesized synthesis sound to produce formed synthesis sound information and for producing the synthesis sound,
wherein said waveform compressing portion (102B) sends the formed synthesis sound information to said waveform storing portion with it contained in a part of the compressed waveform data, wherein said server-side apparatus (200F) further comprises:
a synthesis sound information obtaining portion (207) for obtaining the synthesis sound information from the decompressed waveform data to produce obtained synthesis sound information, and
wherein said recognizing means (204C) associates the synthesis sound with the recognition result from the obtained synthesis sound information upon ending the recognition to produce an associated recognition result or the recognition result and the synthesis sound information.

9. A terminal (100B, 100C, 100D, 100D, 100E, 100F) connected to a server apparatus (200B, 200D, 200E, 200F) which receives and decompresses compressed waveform data transmitted therefrom, performs recognition processing by using the decompressed waveform data, and produce a recognition result, said terminal (100B, 100C, 100D, 100E, 100F) and said server apparatus constituting a server-client speech recognition apparatus, said terminal comprising:
a waveform and signal reception portion (104, 104A, 104B) for receiving waveform data of an inputted speech and a waveform data re-transmission request signal transmitted from said server apparatus to produce received waveform data and a received waveform data re-transmission request signal;
a speech detection portion (101A) for detecting a speech interval of the received waveform data to produce waveform data at the detected speech interval;
a waveform compressing portion (102, 102A, 102B) for compressing the waveform data at the detected speech interval to produce compressed waveform data;
a waveform storing portion (105) for temporarily storing the compressed waveform data to produce stored waveform data and for producing the stored waveform data in response to the received waveform data re-transmission request signal; and
a waveform transmission portion (103) for transmitting the stored waveform data to the server apparatus,
wherein said terminal (100B, 100C, 100D, 100E, 100F) further comprises:
a start-point cancel signal transmission portion (106) for receiving a signal at the timing of a start point transmitted from said speech detection portion when said speech detection portion (101 A) detects the speech and thereafter cancels the detection to transmit a start-point cancel signal to said server apparatus.

10. A terminal as claimed in claim 9, further comprising:
a compressing method selection portion (110) for selecting an optimum compressing method from the compressing method information to produce a compressed compressing method when said waveform and signal reception portion (104A) receives the compressing method information available to said server-side apparatus transmitted from said server-side apparatus; and
a compressing method index forming portion (109) for forming an index of the selected compressing method to produce a formed compressing method index,
wherein said waveform compression portion (102B) contains the formed compressing method index in a part of the compressed waveform data.

11. A terminal as claimed in claim 10, further comprising:
a speech synthesizing portion (107) for synthesizing synthesis sound to produce synthesized synthesis sound; and
a synthesis sound information forming portion (108) for forming information on the synthesized synthesis sound to produce formed synthesis sound information and for producing the synthesis sound, wherein said waveform compression portion (102B) contains the formed synthesis sound information in a part of the compressed waveform data.

12. A terminal as claimed in claim 9, further comprising:

a speech synthesizing portion (107) for synthesizing synthesis sound to produce synthesized synthesis sound; and a synthesis sound information forming portion (108) for forming information on the synthesized synthesis sound to produce formed synthesis sound information and for producing the synthesis sound, wherein said waveform compression portion (102A, 102B) contains the formed synthesis sound information in a part of the compressed waveform data.

13. A terminal as claimed in claim 12, wherein said waveform and signal reception portion (104B) receives the inputted waveform data, task information transmitted from a contents side, a waveform data re-transmission request signal transmitted from said server apparatus, and compressing method information available to said server apparatus transmitted from said server apparatus, wherein said terminal further comprises:

a task information storing portion (113) for storing the received task information to produce stored task information;

a compressing method and task information corresponding table storing portion (111A) for storing a corresponding table between the task information and one or more compressing methods available to the use of a task;

a compressing method selection portion (110A) for selecting an optimum compressing method based on the stored task information, the corresponding table between the task information and the compressing method transmitted from said compressing method and task corresponding table storing portion, and the received compressing method information to produce a selected compressing method when said waveform and signal reception portion receives the compressing method information available to said server apparatus; and a compressing method index forming portion (109) for forming an index of the selected compressing method to produce a formed compressing method index, and wherein said waveform compression portion (102B) contains the formed compressing method index in a part of the compressed waveform data.

14. A terminal as claimed in claim 9, wherein said waveform and signal reception portion (104B) receives the inputted waveform data, task information transmitted from a contents side, a waveform data re-transmission request signal transmitted from said server apparatus, and compressing method information available to said server apparatus transmitted from said server apparatus, wherein said terminal further comprises:

a task information storing portion (113) for storing the received task information to produce stored task information;

a compressing method and task information corresponding table storing portion (111A) for storing a corresponding table between the task information and one or more compressing methods available to the use of a task;

a compressing method selection portion (110A) for selecting an optimum compressing method based on the stored task information, the corresponding table between the task information and the compressing method transmitted from said compressing method and task corresponding table storing portion, and the received compressing method information to produce a selected compressing method when said waveform and signal reception portion receives the compressing method information available to said server apparatus; and a compressing method index forming portion (109) for forming an index of the selected compressing method to produce a formed compressing method index, and wherein said waveform compression portion (102B) contains the formed compressing method index in a part of the compressed waveform data.

15. A terminal (100D, 100E, 100F) connected to a server apparatus (200D, 200E, 200F) which receives and decompresses compressed waveform data transmitted therefrom, performs recognition processing by using the decompressed waveform data, and produce a recognition result, said terminal (100D) and said server apparatus constituting a server-client speech recognition apparatus, said terminal comprising:

a waveform and signal reception portion (104A, 104B) for receiving waveform data of an inputted speech and a waveform data re-transmission request signal transmitted from said server apparatus to produce received waveform data and a received waveform data re-transmission request signal:

a speech detection portion (101A) for detecting a speech interval of the received waveform data to produce waveform data at the detected speech interval;

a waveform compressing portion (102B) for compressing the waveform data at the detected speech interval to produce compressed waveform data;

a waveform storing portion (105) for temporarily storing the compressed waveform data to produce stored waveform data and for producing the stored waveform data in response to the received waveform data re-transmission request signal; and a waveform transmission portion (103) for transmitting the stored waveform data to the server apparatus, wherein said terminal (100D, 100E, 100F) further comprises:

a compressing method selection portion (110, 110A) for selecting an optimum compressing method from the compressing method information to produce compressed compressing method when said waveform and signal reception portion (104A, 104B) receives the compressing method information available to said server-side apparatus transmitted from said serve-side apparatus; and a compressing method index forming portion (109) for forming an index of the selected compressing method to produce a formed compressing method index, wherein said waveform compression portion (102B) contains the formed compressing method index in a part of the compressed waveform data.

a synthesis sound information forming portion (108) for forming information on the synthesized synthesis sound to produce formed synthesis sound information and for producing the synthesis sound, wherein said waveform compression portion (102B) contains the formed synthesis sound information in a part of the compressed waveform data.

16. A terminal as claimed in claim 15, further comprising:

a speech synthesizing portion (107) for synthesizing synthesis sound to produce synthesized synthesis sound; and a synthesis sound information forming portion (108) for forming information on the synthesized synthesis sound to produce formed synthesis sound information and for producing the synthesis sound, wherein said waveform compression portion (102B) contains the formed synthesis sound information in a part of the compressed waveform data.

17. A terminal (100F) connected to a server apparatus (200F) which receives and decompresses compressed waveform data transmitted therefrom, performs recognition processing by using the decompressed waveform data, and produce a recognition result, said terminal (100F) and said server apparatus constituting a server-client speech recognition apparatus, said terminal comprising:

a waveform and signal reception portion (104B) for receiving waveform data of an inputted speech and a waveform data re-transmission request signal transmitted from said server apparatus to produce received waveform data and a received waveform data re-transmission request signal;

a speech detection portion (101A) for detecting a speech interval of the received waveform data to produce waveform data at the detected speech interval;

a waveform compressing portion (102B) for compressing the waveform data at the detected speech interval to produce compressed waveform data; a waveform storing portion (105) for temporarily storing the compressed waveform data to produce stored waveform data and for producing the stored waveform data in response to the received waveform data re-transmission request signal; and a waveform transmission portion (103) for transmitting the stored waveform data to the server apparatus, wherein said waveform and signal reception portion (104B) for receiving the inputted waveform data, task information transmitted from a contents side, a waveform data re-transmission request signal transmitted from said server apparatus, and compressing method information available to said server apparatus transmitted from said server apparatus, wherein said terminal further comprises:

a task information storing portion (113) for storing the received task information to produce stored task information;

a compressing method and task information corresponding table storing portion (111A) for storing a corresponding table between the task information and one or more compressing methods available to the use of a task;

a compressing method selection portion (110A) for selecting an optimum compressing method based on the stored task information, the corresponding table between the task information and the compressing methods transmitted from said compressing method and task corresponding table storing portion, and the received compressing method information to produce a selected compressing method when said waveform and signal reception portion receives the compressing method information available to said server apparatus; and a compressing method index forming portion (109) for forming an index of the selected compressing method to produce a formed compressing method index, and wherein said waveform compression portion (102B) contains the formed compressing method index in a part of the compressed waveform data.

18. A terminal (100F) connected to a server apparatus (200F) which receives and decompresses compressed waveform data transmitted therefrom, performs recognition processing by using the decompressed waveform data, and produce a recognition result, said terminal (100F) and said server apparatus constituting a server-client speech recognition apparatus, said terminal comprising:

a waveform and signal reception portion (104B) for receiving waveform data of an inputted speech and a waveform data re-transmission request signal transmitted from said server apparatus to produce received waveform data and a received waveform data re-transmission request signal;

a speech detection portion (101A) for detecting a speech interval of the received waveform data to produce waveform data at the detected speech interval;

a waveform compressing portion (102B) for compressing the waveform data at the detected speech interval to produce compressed waveform data;

a waveform storing portion (105) for temporarily storing the compressed waveform data to produce stored waveform data and for producing the stored waveform data in response to the received waveform data re-transmission request signal;

a waveform transmission portion (103) for transmitting the stored waveform data to the server apparatus; a speech synthesizing portion (107) for synthesizing synthesis sound to produce synthesized synthesis sound; and a synthesis sound information forming portion (108) for forming information on the synthesized synthesis information to produce formed synthesis sound information and for producing the synthesis sound, wherein said waveform compressing portion (102B) contains the formed synthesis sound information in a part of the compressed waveform data, wherein said waveform and signal reception portion (104B) receives the inputted waveform data, task information transmitted from a contents side, a waveform data re-transmission request signal transmitted from said server apparatus, and compressing method information available to said server apparatus transmitted from said server apparatus, wherein said terminal further comprises:

a task information storing portion (113) for storing the received task information to produce stored task information;

a compressing method and task information corresponding table storing portion (111A) for storing a corresponding table between the task information and one or more compressing methods available to the use of a task;

a compressing method selection portion (110A) for selecting an optimum compressing method based on the stored task information, the corresponding table between the task information and the compressing method transmitted from said compressing method and task corresponding table storing portion, and the received compressing method information to produce a selected compressing method when said waveform and signal reception portion receives the compressing method information available to said server apparatus; and a compressing method index forming portion (109) for forming an index of the selected compressing method to produce formed compressing method index, and wherein said waveform compression portion (102B) contains the formed compressing method index in a part of the compressed waveform data.

19. A server apparatus (200B, 200C, 200D, 200E, 200F) connected to a terminal (100B, 100C, 100D, 100E, 100F) which detects a speech interval of inputted data, compresses waveform data at the detected speech interval, and transmits the compressed waveform data, said server apparatus and said terminal constituting a server-client speech recognition apparatus, said server apparatus comprising:

a reception portion (201B, 201C, 201D) for receiving the waveform data transmitted from said terminal to produce the received waveform data;

a waveform decompression portion (202, 202A, 202B) for decompressing the received waveform data to produce decompressed waveform data; and recognizing means (203, 203A, 204A, 204B, 204C, 205, 205A) for performing recognition processing by using the decompressed waveform data to produce a recognition result, wherein when said reception portion (201B, 201C, 201D) receives a start-point cancel signal transmitted when said terminal detects the speech and thereafter the detection is canceled, said recognizing means (204A, 204B, 204C) stops the recognition processing based on the notification from said reception portion.

20. A server apparatus as claimed in claim 19, wherein said reception portion (210C) receives a compressing method request signal transmitted from said terminal to produce a received compressing method request signal, and wherein said server apparatus comprises:

a compressing method storing portion (212) for storing information on the compressing method available to the server side;

a compressing method obtaining portion (211) for obtaining, in response to the received compressing method request signal, the compressing method information stored in said compressing method storing portion to transmit the compressing method information to said terminal;

a compressing method index portion (208) for obtaining an index of the compressing method from the decompressed data to produce an obtained compressing method index;

a recognition engine selection portion (209) for selecting a recognition engine from the obtained compressing method index to produce a selected recognition engine; and a recognition engine setting portion (210) for setting the selected engine from stored engines.

21. A server apparatus as claimed in claim 19, further comprising:

a synthesis sound information obtaining portion (207) for obtaining synthesis sound information from the waveform data decompressed by said waveform decompression portion (202A) to produce obtained synthesis sound information, wherein said recognizing portion (204B) associates the synthesis sound with the recognition result from the obtained synthesis sound information upon ending the recognition to produce an associated recognition result or the recognition result and the synthesis sound information.

22. A server apparatus as claimed in claim 19, wherein said reception portion (201D) receives the waveform data transmitted from said terminal, a start-point cancel signal, a compressing method request signal, and task information transmitted from a contents side, and wherein said server apparatus further comprises:

a task information storing portion (213) for storing the task information received by said reception portion to produce stored task information;

a compressing method and task information corresponding table storing portion (212A) for storing the task information and one or more compressing methods available to the use of the task; and a compressing method obtaining portion (211A) for obtaining available compressing method information from the stored task information and the corresponding table between the task information and the compressing method transmitted from said compressing method and task information corresponding table storing portion to transmit it to said terminal when said reception portion receives the compressing method request signal.

23. A server apparatus (200D, 200F) connected to a terminal (100D, 100F) which detects a speech interval of inputted data, compresses waveform data at the detected speech interval, and transmits the compressed waveform data, said server apparatus and said terminal constituting a server-client speech recognition apparatus, said server apparatus comprising:

a reception portion (201C) for receiving the waveform data transmitted from said terminal to produce the received waveform data;

a waveform decompression portion (202B) for decompressing the received waveform data to produce decompressed waveform data; and recognizing means (203A, 204C, 205A) for performing recognition processing by using the decompressed waveform data to produce a recognition result, wherein said reception portion (201C) receives a compressing method request signal transmitted from said terminal to produce a received compressing method request signal, and wherein said server apparatus further comprises:

a compressing method storing portion (212) for storing information on the compressing method available to the server side; a compressing method obtaining portion (211) for obtaining, in response to the received compressing method request signal, the compressing method information stored in said compressing method storing portion to transmit the compressing method information to said terminal;

a compressing method index obtaining portion (208) for obtaining an index of the compressing method from the decompressed data to produce an obtained compressing method index;

a recognition engine selection portion (209) for selecting a recognition engine from the obtained compressing method index to produce a selected recognition engine; and a recognition engine setting portion (210) for setting the selected engine from stored engines.

24. A server apparatus as claimed in claim 23, further comprising:

a synthesis sound information obtaining portion (207) for obtaining synthesis sound information from the waveform data decompressed by said waveform decompression portion (202B) to produce obtained synthesis sound information, wherein said recognizing portion (204C) associates the synthesis sound with the recognition result from the obtained synthesis sound information upon ending the recognition to produce an associated recognition result or the recognition result and the synthesis sound information.

25. A server apparatus (200F) connected to a terminal (100F) which detects a speech interval of inputted data, compresses waveform data at the detected speech interval, and transmits the compressed waveform data, said server apparatus and said terminal constituting a server-client speech recognition apparatus, said server apparatus comprising:

a reception portion (201C) for receiving the waveform data transmitted from said terminal to produce the received waveform data;

a waveform decompression portion (202B) for decompressing the received waveform data to produce decompressed waveform data; recognizing means (203A, 204C, 205A) for performing recognition processing by using the decompressed waveform data to produce a recognition result; and a waveform data re-transmission request signal transmission portion (206) for transmitting a waveform data re-transmission request signal to said terminal when the reception of the compressed waveform data fails in said reception portion (201C).

wherein said reception portion (201C) receives a compressing method request signal transmitted from said terminal to produce a received compressing method request signal, and wherein said server apparatus further comprises:

a compressing method storing portion (212) for storing information on the compressing method available to the server side;

a compressing method obtaining portion (211) for obtaining, in response to the received compressing method request signal, the compressing method information stored in said compressing method storing portion to transmit the compressing method information to said terminal; a compressing method index obtaining portion (208) for obtaining an index of the compressing method from the decompressed data to produce an obtained compressing method index;

a recognition engine selection portion (209) for selecting a recognition engine from the obtained compressing method index to produce a selected recognition engine; and a recognition engine setting portion (210) for setting the selected engine from stored engines.

26. A server apparatus (200E) connected to a terminal (100B) which detects a speech interval of inputted data, compresses waveform data at the detected speech interval, and transmits the compressed waveform data, said server apparatus and said terminal constituting a server-client speech recognition apparatus, said server apparatus comprising:

a reception portion (201D) for receiving the waveform data transmitted from said terminal to produce the received waveform data;

a waveform decompression portion (202B) for decompressing the received waveform data to produce decompressed waveform data; and recognizing means (203A, 204C, 205A) for performing recognition processing by using the decompressed waveform data to produce a recognition result, wherein said reception portion (201D) receives waveform data transmitted from said terminal, a start-point cancel signal, a compressing method request signal, and task information transmitted from a contents side, and wherein said server apparatus further comprises:

a task information storing portion (213) for storing the task information received by said reception portion to produce stored task information;

a compressing method and task information corresponding table storing portion (212A) for storing the task information and one or more compressing methods available to the use of the task; and a compressing method obtaining portion (211A) for obtaining available compressing method information from the stored task information and the corresponding table between the task information and the compressing method transmitted from said compressing method and task infonnation corresponding table storing portion to transmit it to said terminal when said reception portion receives the compressing method request signal.

27. A server apparatus (200E) connected to a terminal (100E) which detects a speech interval of inputted data, compresses waveform data at the detected speech interval, and transmits the compressed waveform data, said server apparatus and said terminal constituting a server-client speech recognition apparatus, said server apparatus comprising:

a reception portion (201D) for receiving the waveform data transmitted from said terminal to produce the received waveform data;

a waveform decompression portion (202B) for decompressing the received waveform data to produce decompressed waveform data; recognizing means (203A, 204C, 205A) for performing recognition processing by using the decompressed waveform data to produce a recognition result; and a waveform data re-transmission request signal transmission portion (206) for transmitting a waveform data re-transmission request signal to said terminal when the reception of the compressed waveform data fails in said reception portion (201D), wherein said reception portion (201D) receives the waveform data transmitted from said terminal, a start-point cancel signal, a compressing method request signal, and task information transmitted from a contents side, and wherein said server apparatus further comprises: a task information storing portion (213) for storing the task information received by said reception portion to produce stored task information;

a compressing method and task information corresponding table storing portion (212A) for storing the task information and one or more compressing methods available to the use of the task; and a compressing method obtaining portion (211A) for obtaining available compressing method information from the stored task information and the corresponding table between the task information and the compressing method transmitted from said compressing method and task information corresponding table storing portion to transmit it to said terminal when said reception portion receives the compressing method request signal.

28. A speech recognition method of a server-client system comprising a server apparatus (200B) and a terminal (10B, said speech recognition method comprising:

in said terminal (100B), a step (101A) of detecting a speech interval of inputted data;

a step (102) of compressing waveform data of the detected speech interval;

a step (103) of transmitting the compressed waveform data to said server apparatus; and a step (106) of transmitting a start-point cancel signal to said server apparatus when the speech is detected and thereafter the detection is canceled; and in said server apparatus (200B), a step (201B) of receiving the waveform data outputted from said terminal;

a step (202) of decompressing the received waveform data;

a step (203, 204A, 205 of performing recognition processing by using the decompressed waveform data to produce a recognition result; and a step (201B, 204A) of stopping the recognition processing when the start-point cancel signal from said terminal is received.

29. A speech recognition method of a server-client system comprising a server apparatus (200B, 200C, 200D, 200E, 200F) and a terminal (100B, 100C, 100D, 100E, 100F), said speech recognition method comprising:

in said terminal (100B, 100C, 100D, 100D, 100C, 100E, 100F), a step (104, 104A, 104B) of receiving waveform data of an inputted speech;

a step (101A) of detecting a speech interval of the received waveform data;

a step (102, 102A, 102B of compressing the waveform data of the detected speech interval;

a step (103) of temporarily storing the compressed waveform data into a waveform storing portion (105) to transmit the compressed waveform data to said server apparatus:

a step (104, 104A, 104B, 103) of transmitting, to said server apparatus. the waveform data stored in said waveform storing portion (105) on reception of a waveform data re-transmission request signal transmitted from said serer apparatus; and a step (106) of transmitting a start-point cancel signal to said server apparatus when the speech is detected and thereafter the detection is canceled; and in said server apparatus (200B, 200C, 200D, 200E, 200F), a step (201B, 201C, 201D) of receiving the waveform data outputted from said terminal; a step (202, 202A, 202B) of decompressing the received waveform data; a step (203, 203A, 204, 204A, 204B, 204C, 205, 205A) of performing recognition processing by using the decompressed waveform data to produce a recognition result;

a step (206) of transmitting the waveform data re-transmission request signal to said terminal when the reception of the compressed waveform data transmitted from said terminal fails; and a step (201B, 201C, 201D, 204A, 204B, 204C) of stopping the recognition processing when the start-point cancel signal from said terminal is received.

30. A speech recognition method as claimed in claim 29, further comprising:

in said terminal (100D, 100F), a step (104A) of receiving compressing method information available to the server side transmitted from said server apparatus;

a step (110) of selecting an optimum compressing method from the receiving compressing method information;

a step (109) of forming an index of the selected compressing method; and a step (102B, 105, 103) of compressing the waveform data of the speech interval to transmit it to said server apparatus with the formed compressing method index contained in a part of the compressed waveform data; and in said server apparatus (200D, 200F), a step (211) of, when a compressing method request signal transmitted from said terminal is received, obtaining the compressing method information stored in a compressing method storing portion (212) for storing the compressing method information available to the server side to transmit the compressing method information to said terminal;

a step (208) of obtaining an index of the compressing method from the decompressed data;

a step (209) of selecting an recognition engine from the obtained compressing method index; and a step (210) of setting the selected engine from stored engines.

31. A speech recognition method as claimed in claim 30, further comprising:

in said terminal (100D, 100F), a step (107) of synthesizing a synthesis sound;

a step (108) of forming information on the synthesized synthesis sound to produce the synthesis sound;

a step (102B, 105, 103) of compressing the waveform data at the detected speech interval to transmit it to said server apparatus with the formed synthesis sound information contained in a part of the waveform data; and in said server apparatus (200D, 200F), a step (207) of obtaining the synthesis sound information from the decompressed data, wherein upon ending the recognition, the synthesis sound is associated with the recognition result from the obtained synthesis sound information to produce an associated recognition result or the recognition result and the synthesis sound information (204C).

32. A speech recognition method as claimed in claim 31, further comprising:

in said terminal (100F), a step (104B) of receiving task information transmitted from a contents side and compressing method information available to the server side transmitted from said server apparatus; and a step (110A) of, when the compressing method information available to the server side, selecting an optimum compressing method based on the task information, a corresponding table between the task information and compressing methods transmitted from a compressing method and task corresponding table storing portion (111A), and the compressing method information available to said server apparatus.

33. A speech recognition method as claimed in claim 29, further comprising:

in said terminal (100D, 100E, 100F), a step (107) of synthesizing a synthesis sound;

a step (108) of forming information on the synthesized synthesis sound to produce the synthesis sound;

a step (102B, 105, 103) of compressing the waveform data at the detected speech interval to transmit it to said server apparatus with the formed synthesis sound information contained in a part of the waveform data; and in said server apparatus (200D, 200E, 200F), a step (207) of obtaining the synthesis sound information from the decompressed data, wherein upon ending the recognition, the synthesis sound is associated with the recognition result from the obtained synthesis sound information to produce an associated recognition result or the recognition result and the synthesis sound information (204C).

34. A speech recognition method as claimed in claim 33, further comprising:

in said server apparatus (200E), a step (201D) of receiving task information transmitted from a contents side to store it in a task information storing portion (213); and a step (201D, 211A) of, when a compressing method request signal is received, obtaining available compressing method information from a corresponding table (212A) between the task information and compressing methods to transmit it to said terminal.

35. A speech recognition method as claimed in claim 33, further comprising:

in said terminal (100F), a step (104B) of receiving task information transmitted from a contents side and the compressing method information available to the server side transmitted from said server apparatus; and a step (110A) of, when the compressing method information available to the server side is received, selecting an optimum compressing method based on the task information, a corresponding table between the task information and compressing methods transmitted from a compressing method and task corresponding table storing portion (111A), and the compressing method information available to said server apparatus.

36. A speech recognition method as claimed in claim 29, further comprising:

in said server apparatus (200E), a step (201D) of receiving task information transmitted from a contents side to store it in a task information storing portion (213); and a step (201D, 211A) of, when a compressing method request signal is received, obtaining available compressing method information from a corresponding table (212A) between the task information and compressing methods to transmit it to said terminal.

37. A speech recognition method as claimed in claim 29, further comprising:

in said terminal (100F), a step (104B) of receiving task information transmitted from a contents side and compressing method information available to the server side transmitted from said server apparatus; and a step (110A) of, when the compressing method information available to the server side is received, selecting an optimum compressing method based on the task information, a corresponding table between the task information and compressing methods transmitted from a compressing method and task corresponding table storing portion (111A), and the compressing method information available to said server apparatus.

38. A speech recognition method of a server-client system comprising a server apparatus (200D) and a terminal (100D), said speech recognition method comprising:

in said terminal (100D), a step (104A) of receiving waveform data of an inputted speech:

a step (101A) of detecting a speech interval of the received waveform data;

a step (102B) of compressing the waveform data of the detected speech interval;

a step (103) of temporarily storing the compressed waveform data into a waveform storing portion (105) to transmit the compressed waveform data to said server apparatus;

a step (104A, 103) of transmitting, to said server apparatus, the waveform data stored in said waveform storing portion (105) on reception of a waveform data re-transmission request signal transmitted from said serer apparatus;

a step (104A) of receiving compressing method information available to the server side which is transmitted from said server apparatus;

a step (110) of selecting an optimum compressing method from the received compressing method information;

a step (109) of forming an index of the selected compressing method; and a step (102B, 105, 103) of compressing the waveform data at the speech interval to transmit it to said server apparatus with the formed compressing method index contained in a part of the compressed waveform data; and in said server apparatus (200D), a step (201C) of receiving the waveform data outputted from said terminal;

a step (202B) of decompressing the received waveform data;

a step (203A, 204C, 205A) of performing recognition processing by using the decompressed waveform data to produce a recognition result;

a step (206) of transmitting the waveform data re-transmission request signal to said terminal when the reception of the compressed waveform data transmitted from said terminal fails;

a step (211) of, when the compressing method request signal transmitted from said terminal is received, obtaining the compressing method information stored in a compressing method storing portion (212) for storing the compressing method information available to the server side to transmit the compressing method information to said terminal;

a step (208) of obtaining an index of the compressing method from the decompressed data;

a step (209) of selecting a recognition engine from the obtained compressing method index; and a step (210) of setting the selected engine from stored engines.

39. A speech recognition method of a server-client system comprising a server apparatus (200E) and a terminal (100E), said speech recognition method comprising:

in said terminal (100E), a step (104A) of receiving waveform data of an inputted speech;

a step (101A) of detecting a speech interval of the received waveform data;

a step (102B) of compressing the waveform data of the detected speech interval;

a step (103) of temporarily storing the compressed waveform data into a waveform storing portion (105) to transmit the compressed waveform data to said server apparatus; and a step (104A, 103) of transmitting, to said server apparatus, the waveform data stored in said waveform storing portion (105) on reception of a waveform data re-transmission request signal transmitted from said serer apparatus, and in said server apparatus (200E), a step (201D) of receiving the waveform data outputted from said terminal;

a step (202B) of decompressing the received waveform data;

a step (203A, 204C, 205A) of performing recognition processing by using the decompressed waveform data to produce a recognition result;

a step (206) of transmitting the waveform data re-transmission request signal to said terminal when the reception of the compressed waveform data transmitted from said terminal fails;

a step (201D) of receiving the task information transmitted from a contents side to store it in a task information storing portion (213); and a step (201D, 211A) of, when a compressing method request signal is received, obtaining available compressing method information from a corresponding table (212A) between the task information and compressing methods to transmit it to said terminal.

40. A speech recognition of a server-client system comprising a server apparatus (200E) and a terminal (100E), said speech recognition method comprising:

in said terminal (100E), a step (104A) of receiving waveform data of an inputted speech;

a step (101A) of detecting a speech interval of the received waveform data;

a step (102B) of compressing the waveform data of the detected speech interval;

a step (103) of temporarily storing the compressed waveform data into a waveform storing portion (105) to transmit the compressed waveform data to said server apparatus;

a step (104A, 103) of transmitting, to said server apparatus, the waveform data stored in said waveform storing portion (105) on reception of a waveform data re-transmission request signal transmitted from said serer apparatus;

a step (107) of synthesizing a synthesis sound;

a step (108) of forming information on the synthesized synthesis sound to produce the synthesis sound; and a step (102B, 105, 103) of compressing the waveform data at the detected speech interval to transmit it to said server apparatus with the formed synthesis sound information contained in a part of the waveform data, and in said server apparatus (200E), a step (201D) of receiving the waveform data outputted from said terminal;

a step (202B) of decompressing the received waveform data;

a step (203A, 204C, 205A) of performing recognition processing by using the decompressed wavefonn data to produce a recognition result;

a step (206) of transmitting the waveform data re-transmission request signal to said terminal when the reception of the compressed waveform data transmitted from said terminal fails;

a step (207) of obtaining the synthesis sound information from the decompressed data, upon ending the recognition, the synthesis sound is associated with the recognition result from the obtained synthesis sound information to produce an associated recognition result or the recognition result and the synthesis sound information (204C);

a step (201D) of receiving task information transmitted from a contents side to store it in a task information storing portion (213); and a step (201D, 211A) of, when a compressing method request signal is received, obtaining available compressing method information from a corresponding table (212A) between the task information and compressing methods to transmits it to said terminal.

41. A speech recognition method of a server-client system comprising a server apparatus (200F) and a terminal (100F), said speech recognition method comprising:

in said terminal (100F), a step (104B) of receiving waveform data of an inputted speech;

a step (101A) of detecting a speech interval of the received waveform data;

a step (102B) of compressing the waveform data of the detected speech interval;

a step (103) of temporarily storing the compressed waveform data into a waveform storing portion (105) to transmit the compressed waveform data to said server apparatus;

a step (104B, 103) of transmitting, to said server apparatus, the waveform data stored in said waveform storing portion (105) on reception of a waveform data re-transmission request signal transmitted from said serer apparatus;

a step (107) of synthesizing a synthesis sound; a step (108) of forming information on the synthesized synthesis sound to produce the synthesis sound;

a step (102B, 105, 103) of compressing the waveform data at the detected speech interval to transmit it to said server apparatus with the formed synthesis sound information contained in a part of the waveform data;

a step (104B) of receiving task information transmitted from a contents side and compressing method information available to the server side transmitted from said server apparatus; and a step (110A) of, when the compressing method information available to the server side is received, selecting an optimum compressing method based on the task information, a corresponding table between the task information and compressing methods transmitted from a compressing method and task corresponding table storing portion (111A), and the compressing method information available to said server apparatus, and in said server apparatus (200F), a step (201C) of receiving the waveform data outputted from said terminal;

a step (202B) of decompressing the received waveform data;

a step (203A. 204C, 205A) of performing recognition processing by using the decompressed waveform data to produce a recognition result;

a step (206) of transmitting the waveform data re-transmission request signal to said terminal when the reception of the compressed waveform data transmitted from said terminal fails; and a step (207) of obtaining the synthesis sound information from the decompressed data, wherein upon ending the recognition, the synthesis sound is associated with the recognition result from the obtained synthesis sound information to produce an associated recognition result or the recognition result and the synthesis sound information (204C).

* * * * *

UNITED STATES PATENT AND TRADEMARK OFFICE
CERTIFICATE OF CORRECTION

PATENT NO. : 7,478,046 B2
APPLICATION NO. : 10/481324
DATED : January 13, 2009
INVENTOR(S) : Eiko Yamada et al.

It is certified that error appears in the above-identified patent and that said Letters Patent is hereby corrected as shown below:

Col. 47, line 22 (claim 20): delete "210C" and insert --201C--.

Col. 49, line 40 (claim 26): delete "100B" and insert --100E--.

Signed and Sealed this

Twenty-first Day of September, 2010

David J. Kappos
*Director of the United States Patent and Trademark Office*